US012040542B2

(12) United States Patent
Gaudette et al.

(10) Patent No.: US 12,040,542 B2
(45) Date of Patent: Jul. 16, 2024

(54) DEPLOYABLE ANTENNA ASSEMBLY AND SYSTEM AND METHOD FOR DEPLOYING AN EXTENDABLE STRUCTURE

(71) Applicant: MacDonald, Dettwiler and Associates Corporation, Sainte-Anne-de-Bellevue (CA)

(72) Inventors: Yves Gaudette, Sainte-Anne-de-Bellevue (CA); Stéphane Lamoureux, Mirabel (CA); Steve Larouche, St-Lazare (CA); Richard Horth, Sainte-Anne-de-Bellevue (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 84 days.

(21) Appl. No.: 17/842,232

(22) Filed: Jun. 16, 2022

(65) Prior Publication Data

US 2022/0407235 A1 Dec. 22, 2022

Related U.S. Application Data

(60) Provisional application No. 63/211,465, filed on Jun. 16, 2021.

(51) Int. Cl.
*H01Q 11/08* (2006.01)
*H01Q 1/10* (2006.01)
*H01Q 1/28* (2006.01)

(52) U.S. Cl.
CPC ............ *H01Q 11/083* (2013.01); *H01Q 1/10* (2013.01); *H01Q 1/288* (2013.01); *H01Q 11/086* (2013.01)

(58) Field of Classification Search
CPC ............ H01Q 1/08; H01Q 1/10; H01Q 1/288; H01Q 7/02; H01Q 11/08; H01Q 11/083; H01Q 11/086
See application file for complete search history.

(56) References Cited

U.S. PATENT DOCUMENTS 3,913,109 A * 10/1975 Owen .................... H01Q 1/362 52/110
4,780,727 A * 10/1988 Seal .................... H01Q 11/086 D14/234

(Continued)

FOREIGN PATENT DOCUMENTS

CN 108400421 B * 5/2020 ............... H01Q 1/10
EP 3910739 A1 11/2021

(Continued)

OTHER PUBLICATIONS

European Patent Office, Extended European Search Report for EP Patent App. No. 22020288.1, dated May 16, 2023.

*Primary Examiner* — Ab Salam Alkassim, Jr.
*Assistant Examiner* — Leah Rosenberg
(74) *Attorney, Agent, or Firm* — Own Innovation Inc.; James W. Hinton; Kent C. Howe

(57) ABSTRACT

Provided herein is a deployable antenna assembly, a method of deploying an antenna, and systems and methods for sequentially deploying an extendable structure. The deployable antenna assembly includes an extendable pillar configured to extend in an axial direction along a deployment axis of the deployable antenna assembly to deploy an antenna. The extendable pillar includes at least one extendable element configured to convert between a stowed configuration and a deployed configuration where the deployed configuration is longer in the axial direction than the stowed configuration. The extendable pillar also includes a launcher configured to initiate conversion of the plurality of extend- (Continued)

able elements from the stowed configuration to the deployed configuration, thereby extending the extendable pillar and deploying the antenna.

20 Claims, 20 Drawing Sheets

(56) References Cited

U.S. PATENT DOCUMENTS

| | | | | |
|---|---|---|---|---|
| 5,721,558 | A * | 2/1998 | Holemans | H01Q 11/086 343/895 |
| 10,892,545 | B1 * | 1/2021 | Parsche | H01Q 1/12 |
| 2005/0097833 | A1 * | 5/2005 | Campbell | H01Q 1/10 52/118 |
| 2018/0135794 | A1 * | 5/2018 | Ghazanfari | F16M 11/28 |

FOREIGN PATENT DOCUMENTS

| | | | |
|---|---|---|---|
| JP | H09307339 | A | 11/1997 |
| JP | 3649516 | B2 | 5/2005 |

* cited by examiner

DEPLOYABLE ANTENNA ASSEMBLY AND SYSTEM AND METHOD FOR DEPLOYING AN EXTENDABLE STRUCTURE

TECHNICAL FIELD

The following relates generally to antennas, and more particularly to deployable antennas and systems and methods for deploying an extendable structure.

INTRODUCTION

Antennas, such as ultrahigh frequency ("UHF") antennas, may require a large size in order to provide efficient radiofrequency performance for the application (e.g. for space applications). For example, antennas used in space applications, such as traditional UHF antennas may be too large to be easily accommodated on the earth deck of a satellite and need to be stowed to fit inside the launcher fairing. Further, due to the large size, difficulty may arise when servicing of space-based antennas in outer space is required as the large size of the antenna can inhibit transport of replacement antennas.

More generally, extendable structures, one example of which is a deployable antenna, are desired that have a stowed (non-deployed) configuration and a deployed configuration. Such an extendable structure can act as a support for a mass, such as a radiating element of an antenna, attached directly or indirectly to the extendable structure, such that the mass is extended or translated with the deployment of the extendable structure. Preferably, the ratio of the extendable structure in the stowed configuration to the deployed configuration is relatively low, to limit the space occupied by the extendable structure in the stowed configuration while still being capable of extending to an appropriate length for the application in the deployed configuration.

Accordingly, there is a need for an improved deployable antenna assembly and improved systems and methods for deploying an extendable structure that overcome at least some of the disadvantages of existing systems and methods.

SUMMARY

Provided is a deployable antenna assembly comprising an extendable pillar configured to extend in an axial direction along a deployment axis of the deployable antenna assembly to deploy an antenna. The extendable pillar includes at least one extendable element configured to convert between a stowed configuration and a deployed configuration, wherein the extendable element in a deployed configuration is longer in the axial direction than the extendable element in a stowed configuration; and a launcher configured to initiate conversion of the plurality of extendable elements from the stowed configuration to the deployed configuration, thereby extending the extendable pillar and deploying the antenna.

The deployable antenna assembly may further include a helical radiating element configured to connect to the extendable pillar such that an extendable section of the helical radiating element is translated in the axial direction along the deployment axis upon the extension of the extendable pillar in the axial direction, the helical radiating element configured to transmit or receive a radio frequency (RF) signal.

The deployable antenna assembly may further include a fixed base support connected to the helical radiating element, wherein the fixed base support stabilizes the helical radiating element when the helical radiating element extends concurrently in the axial direction with the extendable pillar.

The launcher may include a retaining device configured to retain each extendable element in the stowed configuration in which extension of the respective extendable element is constrained and the extendable element stores potential energy that is releasable to extend the extendable element along the deployment axis.

The retaining device may include ball bearings positioned to contact each extendable element, and movement of the ball bearings initiates conversion of each extendable element from the stowed configuration to the deployed configuration.

The retaining device may include a retaining wire, the retaining wire under tension when the extendable element is in the stowed configuration, and wherein the launcher is configured to release the tension from the retaining wire to initiate conversion of the extendable element from the stowed configuration to the deployed configuration.

The extendable pillar may include a plurality of extendable elements.

The launcher may initiate conversion of each of the extendable elements sequentially.

The launcher may initiate conversion of each of the extendable elements simultaneously.

Each of the extendable elements may include at least one spring tape extendable structure, the at least one spring tape extendable structure folded when the extendable element is in the stowed configuration and unfolded when the extendable element is in the deployed configuration. The at least one spring tape extendable structure is constrained in the stowed configuration and stores potential energy releasable to extend the respective extendable element in the axial direction.

The helical radiating element may operate at an ultrahigh radiofrequency wavelength.

The axial and bending stiffness for the at least one extendable element may be greater in the deployed configuration than in the stowed configuration.

The axial and bending stiffness may be at least 2 orders of magnitude greater in the deployed configuration than in the stowed configuration.

The launcher may guide the at least one extendable element along the axial direction during conversion from the stowed configuration to the deployed configuration Provided is a system for a deployable antenna assembly. The system includes a plurality of extendable elements, wherein each extendable element is configured to: connect with another extendable element to form an extendable pillar, wherein the extendable pillar is configured to extend in an axial direction along a deployment axis; and convert between a stowed configuration and a deployed configuration, wherein each of the extendable elements in a deployed configuration is longer in the axial direction than an extendable element in a stowed configuration; a launcher configured to: connect with the extendable pillar; and initiate conversion of the plurality of extendable elements from the stowed configuration to the deployed configuration; and a helical radiating element configured to: connect, directly or indirectly, to the extendable pillar; extend an extendable section of the helical radiating element, wherein the extendable section is translated in the axial direction along the deployment axis upon the extension of the extendable pillar in the axial direction; and transmit or receive a radio frequency (RF) signal.

The system may include a fixed base configured to connect with the helical radiating element, wherein the fixed base stabilizes the helical radiating element when the helical radiating element extends concurrently in the axial direction with the extendable pillar.

The launcher may include a retaining device configured to retain each extendable element in the stowed configuration in which extension of the respective extendable element is constrained and the extendable element stores potential energy that is releasable to extend the extendable element along the deployment axis.

The retaining device may include ball bearings positioned to contact the extendable elements when the launcher is connected to the extendable pillar, and movement of the ball bearings initiates conversion of the extendable elements from the stowed configuration to the deployed configuration.

The retaining device may include a retaining wire, the retaining wire under tension when the extendable pillar is connected to the launcher and the plurality of extendable elements are in a stowed configuration, and wherein the launcher is configured to release the tension from the retaining wire to initiate conversion of the plurality of extendable elements from the stowed configuration to the deployed configuration.

The launcher may be configured to initiate conversion of each of the extendable elements sequentially.

The launcher may be configured to initiate conversion of each of the extendable elements simultaneously.

The extendable elements may include a plurality of spring tape extendable structures, wherein each of the plurality of spring tape extendable structures is folded when the extendable element is in the stowed configuration and unfolded when the extendable element is in the deployed configuration. Each spring tape extendable structure is constrained in the stowed configuration and stores potential energy releasable to extend the respective extendable element in the axial direction.

The helical radiating element may operate at an ultrahigh radiofrequency wavelength.

The axial and bending stiffness for the at least one extendable element may be greater in the deployed configuration than in the stowed configuration.

The axial and bending stiffness may be at least 2 orders of magnitude greater in the deployed configuration than in the stowed configuration.

The launcher may guide the at least one extendable element along the axial direction during conversion from the stowed configuration to the deployed configuration Provided is a method of deploying an antenna. The method includes extending an extendable pillar along an axial direction, wherein the extendable pillar comprises at least one extendable element, the extending comprising, for each extendable element: converting the extendable element between a stowed configuration and a deployed configuration, wherein the extendable element in a deployed configuration is longer in the axial direction than an extendable element in a stowed configuration; and passively extending a helical radiating element connected to the extendable pillar concurrently with the extension of the extendable pillar, wherein an extendable section of the helical radiating element connected to the extendable pillar is translated in the axial direction along the deployment axis upon the extension of the extendable pillar in the axial direction, the helical radiating element configured to transmit or receive a radio frequency (RF) signal.

The method may include stabilizing the helical radiating element with a fixed support when the helical radiating element extends concurrently in the axial direction with the extendable pillar.

The extendable pillar may include a plurality of extendable elements.

The extendable elements may be converted from the stowed configuration and the deployed configuration sequentially.

The extendable elements may be converted from the stowed configuration and the deployed configuration simultaneously.

The extendable elements may include a plurality of spring tape extendable structures, wherein each of the plurality of spring tape extendable structures is folded when the extendable element is in the stowed configuration and unfolded when the extendable element is in the deployed configuration.

Converting the extendable element between the stowed configuration and the deployed configuration may include converting one or more spring tape extendable structures from a folded configuration to an extended configuration, thereby releasing potential energy stored by the one or more spring tape extendable structures in the folded configuration.

The method may include inputting a command on a user terminal to convert each of the extendable elements from a stowed configuration to a deployed configuration; transmitting the command from a base station to a communications satellite, the extendable pillar disposed on the communications satellite; and performing the method described above in response to receiving the command.

The may include transmitting or receiving an RF signal at an ultrahigh radiofrequency wavelength via the extended helical radiating element.

The axial and bending stiffness for each extendable element may be greater in the deployed configuration than in the stowed configuration.

The axial and bending stiffness may be at least 2 orders of magnitude greater in the deployed configuration than in the stowed configuration.

The method may further include guiding, via a launcher, each extendable element along the axial direction during conversion from the stowed configuration to the deployed configuration.

Provided is a method of sequentially deploying an extendable structure comprising a plurality of extendable elements. The method includes retaining, via a retaining device, each of the plurality of extendable elements in a stowed configuration, wherein each respective one of the plurality of extendable elements includes a at least one spring tape extendable structure, and wherein the at least one spring tape extendable structure is constrained in the stowed configuration and store potential energy releasable to extend the respective one of the plurality of extendable elements along a deployment axis of the extendable structure; sequentially deploying each of the plurality of extendable elements from the stowed configuration to a deployed configuration, the sequentially deploying for a respective one of the plurality of extendable elements including: actuating the retaining device to release the respective one of the plurality of extendable elements; and passively deploying the released respective one of the plurality of extendable elements along the deployment axis via release of the potential energy stored in the at least one spring tape extendable structure of the released respective one of the plurality of extendable elements.

Each respective one of the plurality of extendable elements may include an interface ring attached to the plurality of spring tape extendable structures, wherein the retaining includes retaining the interface ring in a stowed position via the retaining device, wherein the actuating includes actuating the retaining device to release the interface ring, and wherein the passively deploying includes deploying the interface ring along the deployment axis via extension of the plurality of spring tape extendable structures via release of the stored potential energy.

The retaining device may include a plurality of ball bearings including at least one ball bearing per interface ring, wherein the at least one ball bearing contacts the interface ring to retain the interface ring in the stowed position and prevent the interface ring from deploying along the deployment axis, and wherein the actuating the retaining device includes displacing the at least one ball bearing such that the at least one ball bearing does not contact the interface ring, thereby releasing the interface ring.

The extendable pillar may include a plurality of extendable elements.

The axial and bending stiffness for each extendable element may be greater in the deployed configuration than in the stowed configuration.

The axial and bending stiffness may be at least 2 orders of magnitude greater in the deployed configuration than in the stowed configuration.

The launcher may guide each extendable element along the axial direction during conversion from the stowed configuration to the deployed configuration.

Provided is a system for sequentially deploying an extendable structure. The system includes the extendable structure comprising a plurality of extendable elements extendable from a stowed configuration to a deployed configuration along a deployment axis of the extendable structure, each respective one of the plurality of extendable elements including a at least one spring tape extendable structure; a retaining device for retaining each respective one of the plurality of extendable elements in the stowed configuration in which the at least one spring tape extendable structure of the respective one of the plurality of extendable elements are constrained and store potential energy that is releasable to extend the respective one of the plurality of extendable elements along the deployment axis; an actuator for sequentially deploying each of the plurality of extendable elements from the stowed configuration to the deployed configuration by: actuating the retaining device to sequentially release each respective one of the plurality of extendable elements; and passively deploying the respective ones of the plurality of extendable elements via release of the potential energy stored in the at least one spring tape extendable structure of the respective ones of the plurality of extendable elements.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
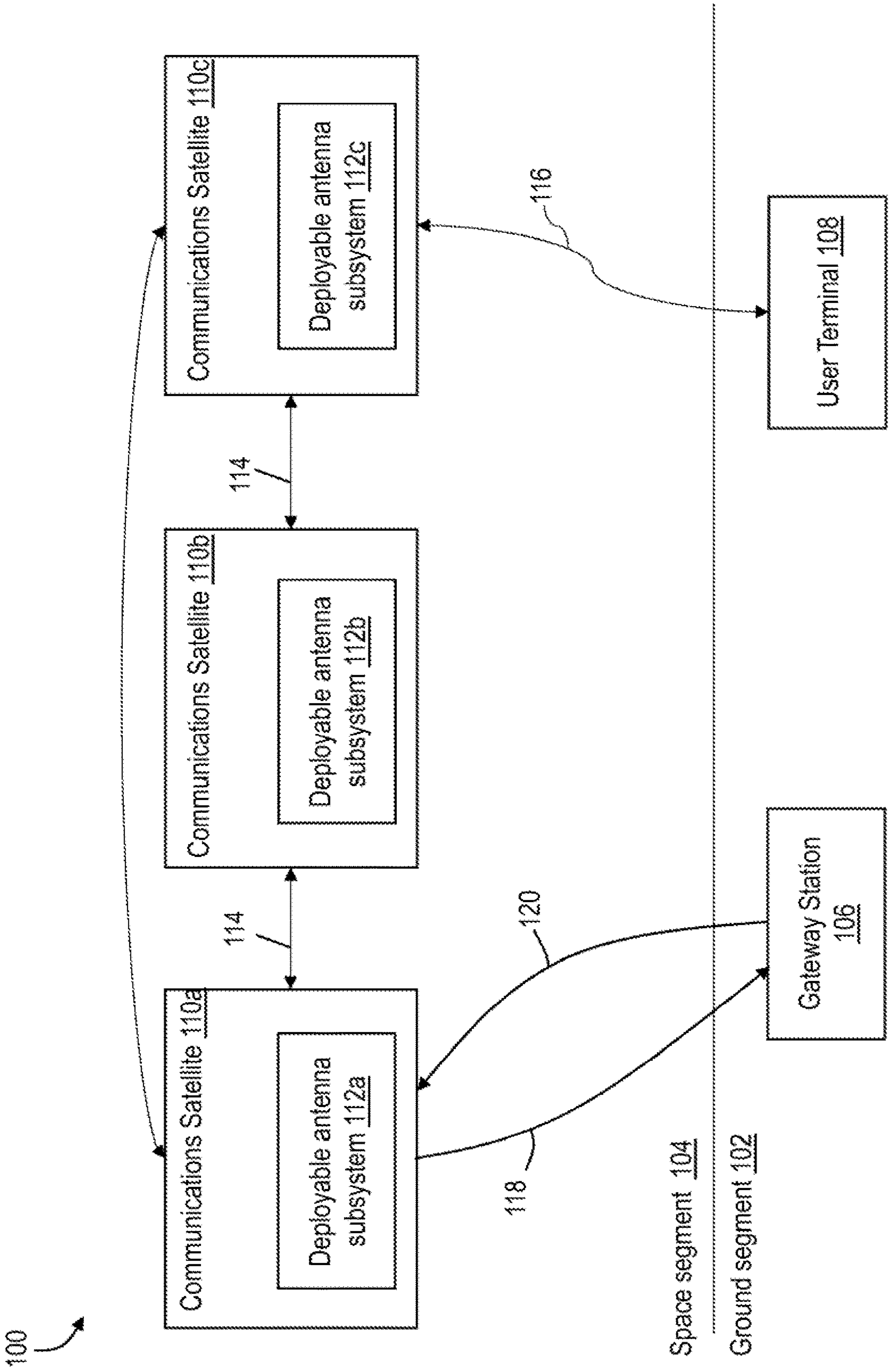
FIG. 1 is a block diagram of a system for satellite-based communication, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to deployable antenna assemblies, and more particularly to a deployable antenna assembly having an extendable structure.

The deployable antenna assembly includes an extendable pillar configured to extend along a deployment axis of the deployable antenna assembly. The extendable pillar includes a plurality of extendable elements. Each extendable element is configured to convert from a stowed configuration to a deployed configuration, the conversion extending the extendable element in an axial direction along the deployment axis. The deployable antenna assembly provides that an extendable element in the deployed configuration is longer in the axial direction than the extendable element in the stowed configuration. The extendable pillar also includes a launcher configured to initiate conversion of the plurality of extendable elements from the stowed configuration to the deployed configuration. The deployable antenna assembly also includes a helical radiating element. The helical radiating element is connected to the extendable pillar such that an extendable portion of the helical radiating element extends concurrently in the axial direction with the extendable pillar.

The deployable antenna assemblies, systems, and methods provided herein may provide various advantages over conventional assemblies, systems, and methods such as improved transmittance and reception of radiofrequency signals. Accordingly, the high volume ratio between deployed and stowed configurations may provide for the use of larger antenna assemblies, which inherently provide better RF performance.

When the deployable antenna assembly is in a stowed configuration, the deployable antenna assembly possesses a low stowed to deployed ratio, for example in the order of between 1 and 5. The low ratio may provide for improved storage and transport capabilities for the antenna assembly over traditional assemblies. The low ratio also allows for transport of larger antennas that traditionally may not have been transported or may have been costly to do so. Improved storage and transport also provides additional advantages when the deployable antenna assembly is incorporated into a applications such as spacecrafts or satellites where storage capacity is minimal. The low stowed-to-deployed ratio of the deployable antenna assembly may enable transport of more deployable antenna assemblies on a single spacecraft.

Additionally, the method of deploying the antenna assembly may also provide for the advantage of low-shock deployment of the antenna. Low-shock deployment allows for minimal impact of mechanical forces on the antenna assembly during deployment. Such low-shock deployment may be particularly advantageous in some applications, such as space-based applications, where shock forces should be controlled to limit impact on surrounding structures such as spacecraft and components onboard. The assemblies, systems, and methods provided herein also provide for the advantages of low cost and low mass antenna assemblies.

The present disclosure also relates generally to extendable structures, and more particularly to systems and methods for deploying an extendable structure. The systems and methods for deploying the extendable structure may advantageously provide a relatively low-shock deployment of the extendable structure. In particular, the present disclosure provides systems and methods for sequential deployment of an extendable structure.

Referring now to FIG. 1, shown therein is a system 100 for satellite-based communication using a deployable antenna assembly, according to an embodiment.

The system 100 includes a ground segment 102 and a space segment 104.

The space segment 104 of system 100 includes communications satellites 110*a*, 110*b*, and 110*c*. Communications satellites 110*a*, 110*b*, 110*c* are referred to herein collectively as communication satellites 110 and generically as communication satellite 110.

It is to be understood that the system 100 may include any number of communication satellites 110 (i.e. one or more). In a particular embodiment, the satellite 110, without limitation, is a low-earth orbit (LEO) satellite. The satellite may be also be used in other orbits other than a LEO. In embodiments of the system 100 including a plurality of satellites 110, the satellites 110 may be referred to collectively as a satellite constellation or satellite network.

The communications satellites 110*a*, 110*b*, 110*c* each include a deployable antenna subsystem (antenna subsystems 112*a*, 112*b*, 112*c*, respectively). Deployable antenna subsystems 112*a*, 112*b*, 112*c* are referred to herein collectively as deployable antenna subsystems 112 and generically as deployable antenna subsystem 112. The deployable antenna subsystem 112 may be configured to perform RF transmission or RF reception in a predetermined signal frequency band. In an embodiment, the predetermined signal frequency band is an ultrahigh frequency (UHF) band. In another embodiment, the predetermined signal frequency band may be L-band, S-band, or VHF.

Communications satellites 110*a*, 110*b*, and 110*c* communicate with one another via inter-satellite communication links 114.

The ground segment 102 includes a gateway earth station ("GES") 106 (or gateway station 106). The system 100 may include a plurality of gateway stations 106, which may be positioned at different locations.

The gateway station 106 may be located on the surface of the Earth, in the atmosphere, or in space. The gateway station 106 may be fixed or mobile.

The gateway station 106, which may be surface-based or atmosphere-based, includes one or more devices configured to provide real-time communication with satellites 110.

The communications satellites 110 communicate with the gateway station 106 via communication downlink 118 and communication uplink 120. In FIG. 1, only communications satellite 110*a* is shown with communication links 118, 120, but it is to be understood that communications satellites 110*b*, 110*c* form similar communication links with the gateway station 106.

The gateway station 106 is configured to establish a telecommunications link 118, 120 with a satellite 110 when the satellite 110 is in "view" of the gateway station 106. The gateway station 106 transmits and/or receives radio ("RF") waves to and/or from the satellite 110. The gateway station 106 may include a parabolic antenna for transmitting and receiving the RF signals. The gateway station 106 may have a fixed or itinerant position.

The gateway station 106 sends radio signals to the satellite 110 (uplink) via communication link 120 and receives data transmissions from the satellite (downlink) via the communication link 118.

The gateway station 106 may serve as a command and control center for a satellite network (or "satellite constellation").

The gateway station 106 may analyze data received from the satellites 110 and/or may relay the received data to another location (i.e. another computer system, such as another gateway station 106) for analysis. In some cases, the gateway station 106 may receive data from the satellite 110 and transmit the received data to a computing device specially configured to perform processing and analysis on the received satellite data.

The gateway station 106 may further be configured to receive data from the satellite 110 and monitor navigation or positioning of the satellite 110 (e.g. altitude, movement) or monitor functioning of the satellite's critical systems (e.g. by analyzing data from the critical system being monitored).

The gateway station 106 may include any one or more of the following elements: a system clock, antenna system, transmitting and receiving RF equipment, telemetry, tracking and command (TT&C) equipment, data-user interface, mission data recovery, and station control center.

The ground segment 102 of system 100 also includes a user terminal 108.

The user terminal 108 may be a fixed or mobile terminal. The user terminal 108 may be any device capable of transmitting and/or receiving RF communication signals. The user terminal 108 includes an RF communication module for transmitting and/or receiving the RF signals. The user terminal 108 may be, for example, a computing device, such as a laptop or desktop, or a mobile device (e.g. smartphone).

The communications satellite 110*c* communicates with the user terminal 108 via communications link 116. Communications performed by satellite 110*c* via communications link 116 may include transmission and reception. While FIG. 1 shows communication link 116 established between the satellite 110*c* and the user terminal 108, it is to be understood that the user terminal 108 may establish a similar communication link with satellite 110*a* or 110*b*. Similarly, the communications satellite 110*c* may establish similar communication links with other user terminals.

Figure 2:
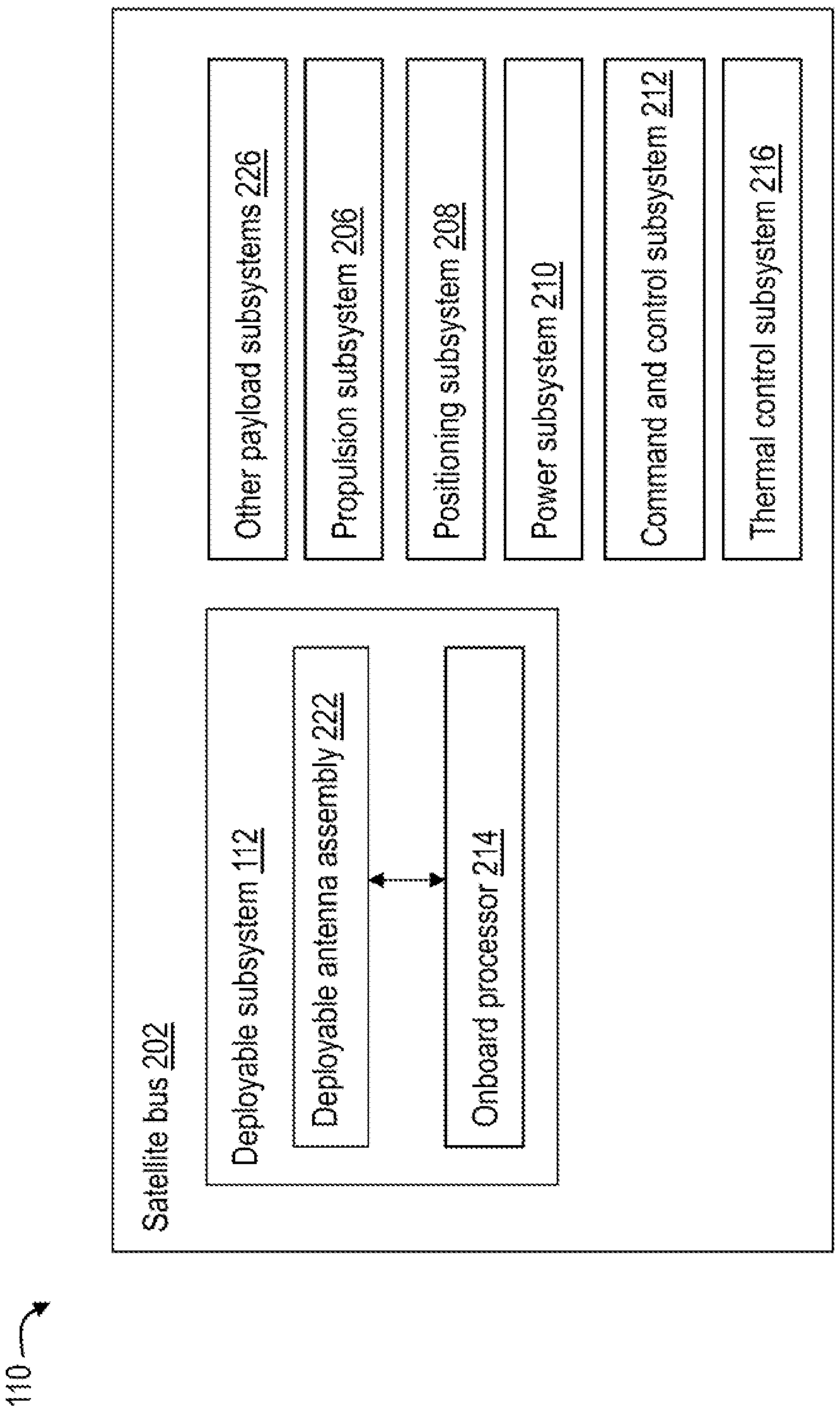
FIG. 2 is a block diagram of a communications satellite of FIG. 1 including a deployable antenna assembly, according to an embodiment.

Referring now to FIG. 2, shown therein is a communications satellite 110 of FIG. 1, according to an embodiment.

The communications satellite 110 includes a satellite bus 202. The satellite bus 202 provides the body of the satellite 110. The satellite bus 202 provides structural support and an infrastructure of the satellite 110 as well as locations for a payload (e.g. various subsystems, such as the deployable antenna subsystem 112). Components of the communications satellite 110 may be housed within an interior of the satellite bus 202 or may be connected to an external surface of the satellite bus 202 (directly or indirectly through another component).

The communications satellite 110 includes a propulsion subsystem 206 for driving the communications satellite 110. The propulsion subsystem 206 adjusts the orbit of the satellite 110. The propulsion subsystem 206 includes one or more actuators, such as reaction wheels or thrusters. The propulsion subsystem 206 may include one or more engines to produce thrust.

The communications satellite 110 includes a positioning subsystem 208. The positioning subsystem 208 uses specialized sensors to acquire sensor data (e.g. measuring orientation) which can be used by a processing unit of the positioning subsystem 208 to determine a position of the satellite 110. The positioning subsystem 208 controls attitude and orbit of the satellite 110. The positioning subsystem 208 communicates with the propulsion subsystem 208.

Together, the positioning subsystem 208 and the propulsion subsystem 206 determine and apply the torques and forces needed to re-orient the satellite 110 to a desired attitude, keep the satellite 110 in the correct orbital position, and keep antennas (e.g. the radiating array 222) pointed in the correct direction.

The communications satellite 110 includes an electrical power subsystem 210. The electrical power subsystem 210 provides power for the radiating array subsystem 112, as well as for other components. The power may be provided through the use of solar panels on the satellite bus 202 that convert solar radiation into electrical current. The power subsystem 210 may also include batteries for storing energy to be used when the satellite 110 is in Earth's shadow.

The communications satellite 110 includes a command and control subsystem 212. The command and control subsystem 212 includes electronics for controlling how data is communicated between components of the communications satellite 110. The propulsion subsystem 206, the positioning subsystem 208, and the power subsystem 210 may each be communicatively connected to the command and control subsystem 212 for transmitting data to and receiving data from the command and control subsystem 212.

The communications satellite 110 also includes a thermal control subsystem (or thermal management subsystem) 216. The thermal control subsystem 216 controls, manages, and regulates the temperature of one or more components of the communications satellite 110 within acceptable temperature ranges, which may include maintaining similar components at a generally uniform temperature. Generally, the thermal control subsystem 216 protects electronic equipment of the radiating array subsystem 112 from extreme temperatures due to self-heating of the radiating array subsystem 112 (i.e. by operation of the signal amplification components of the radiating array subsystem). The thermal control subsystem 216 may include active components or passive components.

The communications satellite 110 may also include other payload subsystems 226. The other payload subsystems 226 may include any one or more of optical intersatellite terminals, gateway antennas, filters, cables, waveguides, etc.

The communications satellite 110 includes a deployable antenna subsystem 112. The deployable antenna subsystem 112 includes a deployable antenna assembly 222 and an onboard processor ("OBP") 214. The deployable antenna assembly 222 is communicatively connected to the OBP 214. The OBP 214 may be part of the satellite's payload.

Figure 3:
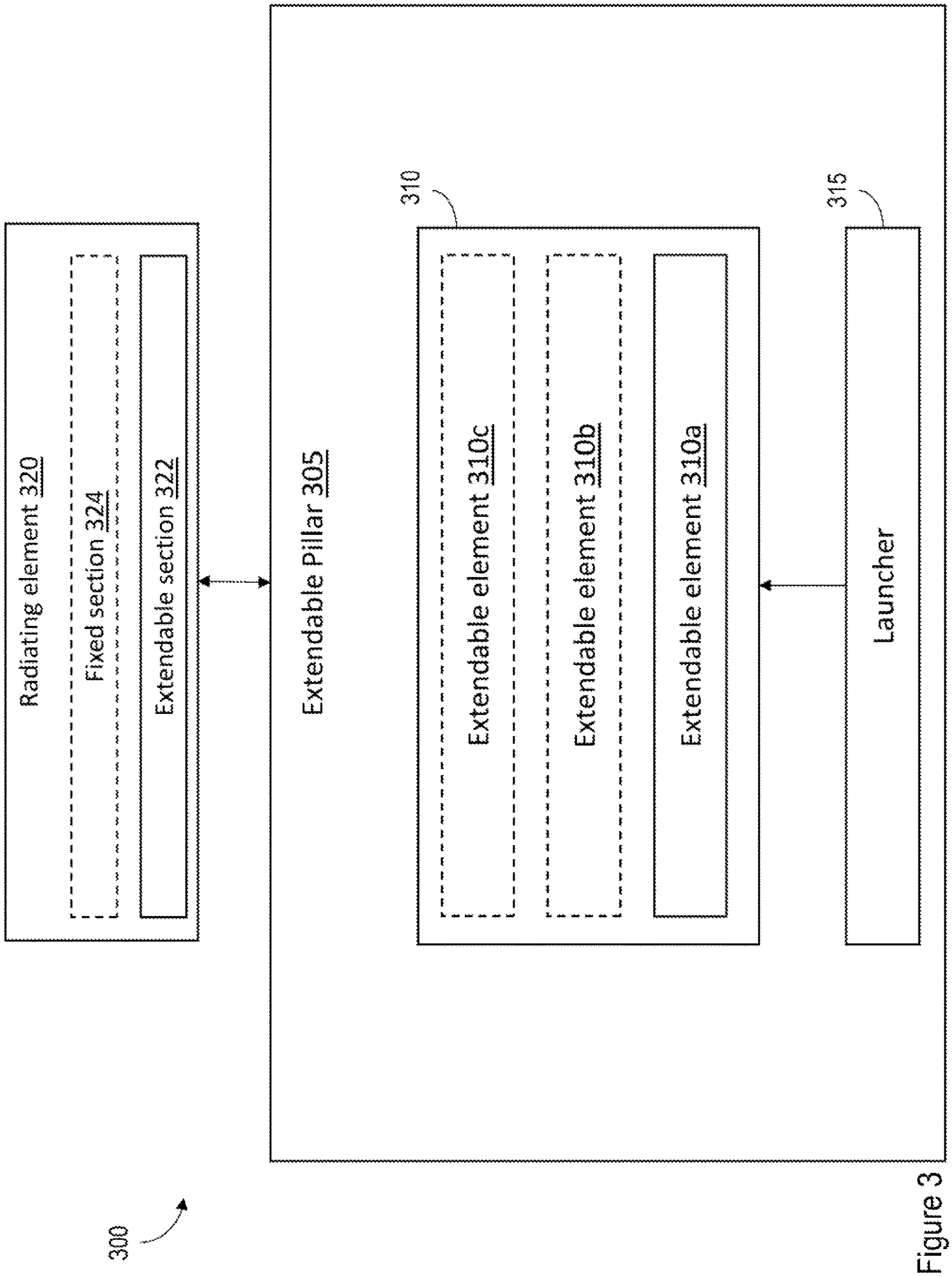
FIG. 3 is a block diagram of a deployable antenna assembly, in accordance with an embodiment.

Referring now to FIG. 3, illustrated therein is a block diagram of a deployable antenna assembly 300, in accordance with an embodiment. The deployable antenna assembly 300 may be the deployable antenna subsystem 112 of FIG. 1 or the deployable antenna assembly 222 of FIG. 2.

The deployable antenna assembly 300 includes an extendable pillar 305. The extendable pillar 305 is configured to extend in an axial direction of the deployable antenna assembly 300.

The extendable pillar 305 includes at least one extendable element 310. Each extendable element 310 is configured to convert between a stowed configuration and a deployed configuration. The deployable antenna assembly 300 provides that an extendable element 310 in a deployed configuration is longer in the axial direction than the extendable element 310 in a stowed configuration. In some embodiments, the extendable pillar may optionally include a plurality of extendable elements 310*a*, 310*b*, 310*c*. Each of the plurality of extendable elements 310*a*, 310*b*, 310*c* may convert from the stowed configuration to the deployed configuration sequentially or simultaneously.

The extendable pillar 305 also includes a launcher 315. The launcher 315 may be a sequential launcher. The launcher 315 is configured to initiate conversion of the plurality of extendable elements 310 from the stowed configuration to the deployed configuration.

The deployable antenna assembly 300 also includes a helical radiating element 320. The helical radiating element 320 is connected to the extendable pillar 305 such that an extendable section 322 of the helical radiating element 320 extends passively and concurrently in the axial direction with the extension of the extendable pillar 305. The helical radiating element 320 may optionally have a fixed section 324. The fixed section 324 may be configured to provide rigid support for the extendable section of the helical radiating element.

Figure 4:
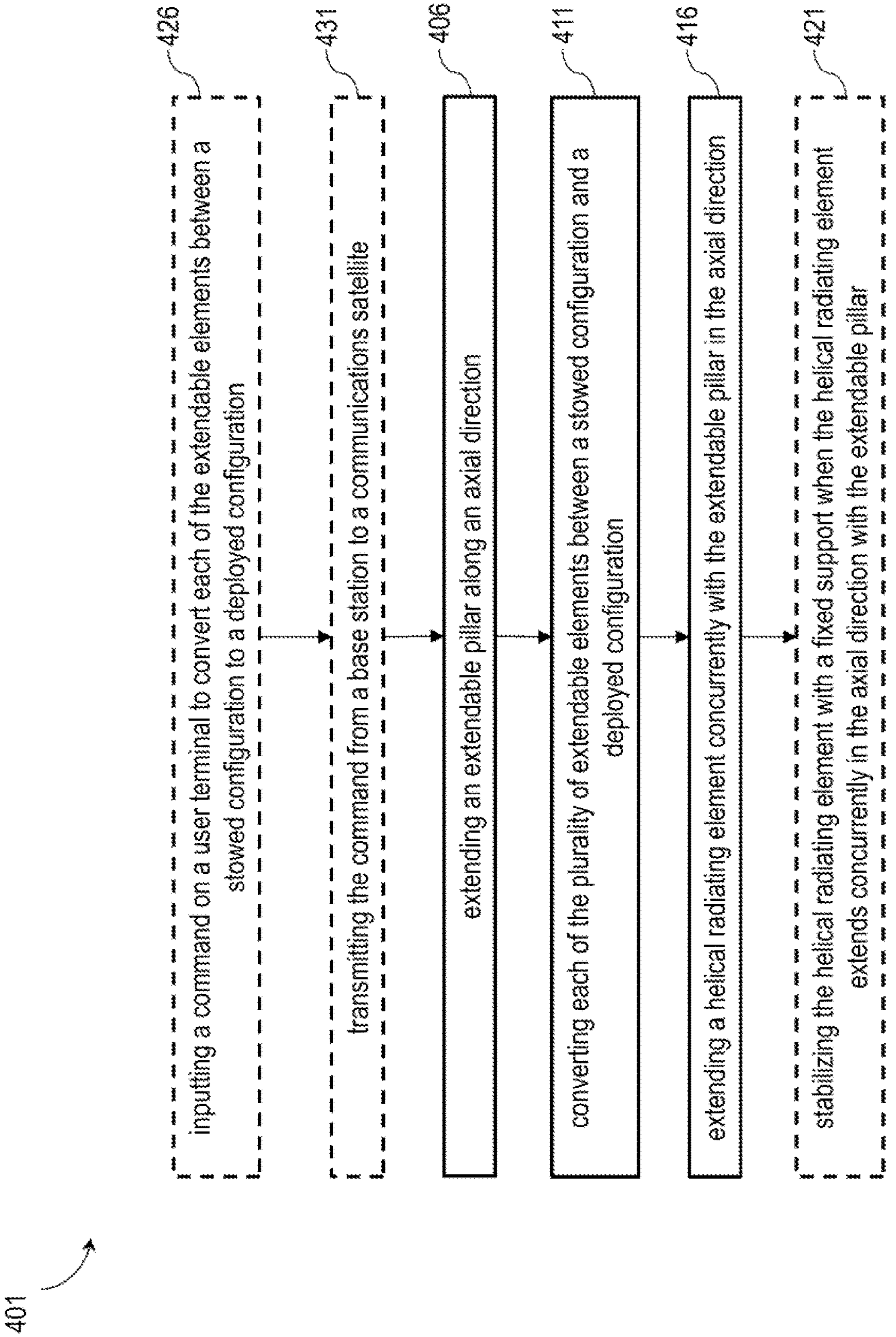
FIG. 4 is a flow diagram of a method of deploying an antenna, in accordance with an embodiment.

Referring now to FIG. 4, illustrated therein is a method 401 of deploying an antenna, in accordance with an embodiment.

The method 401 includes, extending an extendable pillar along an axial direction, at 406. The method 401 provides that the extendable pillar includes a plurality of extendable elements.

The method 401 also includes converting each of the plurality of extendable elements between a stowed configuration and a deployed configuration, at 411. The method 401 provides that each of the extendable elements in the deployed configuration are longer in the axial direction than an extendable element in the stowed configuration.

The method 401 also includes extending a helical radiating element concurrently with the extendable pillar in the axial direction, at 416.

Optionally prior to 406, the method 401 also includes inputting a command on a user terminal to convert the antenna from the stowed configuration to the deployed configuration at 426. Conversion includes converting each of the extendable elements from a stowed configuration to a deployed configuration, at 426. In other cases, the antenna may be deployed automatically without user input.

Optionally, the method 401 also includes transmitting the command inputted at 426 from a base station to a communications satellite on which the deployable antenna is disposed, at 431.

Optionally, at 421, the method 401 includes stabilizing the helical radiating element with a fixed support when the helical radiating element extends concurrently in the axial direction with the extendable pillar. In some embodiments, the fixed support is a fixed base.

Figure 5:
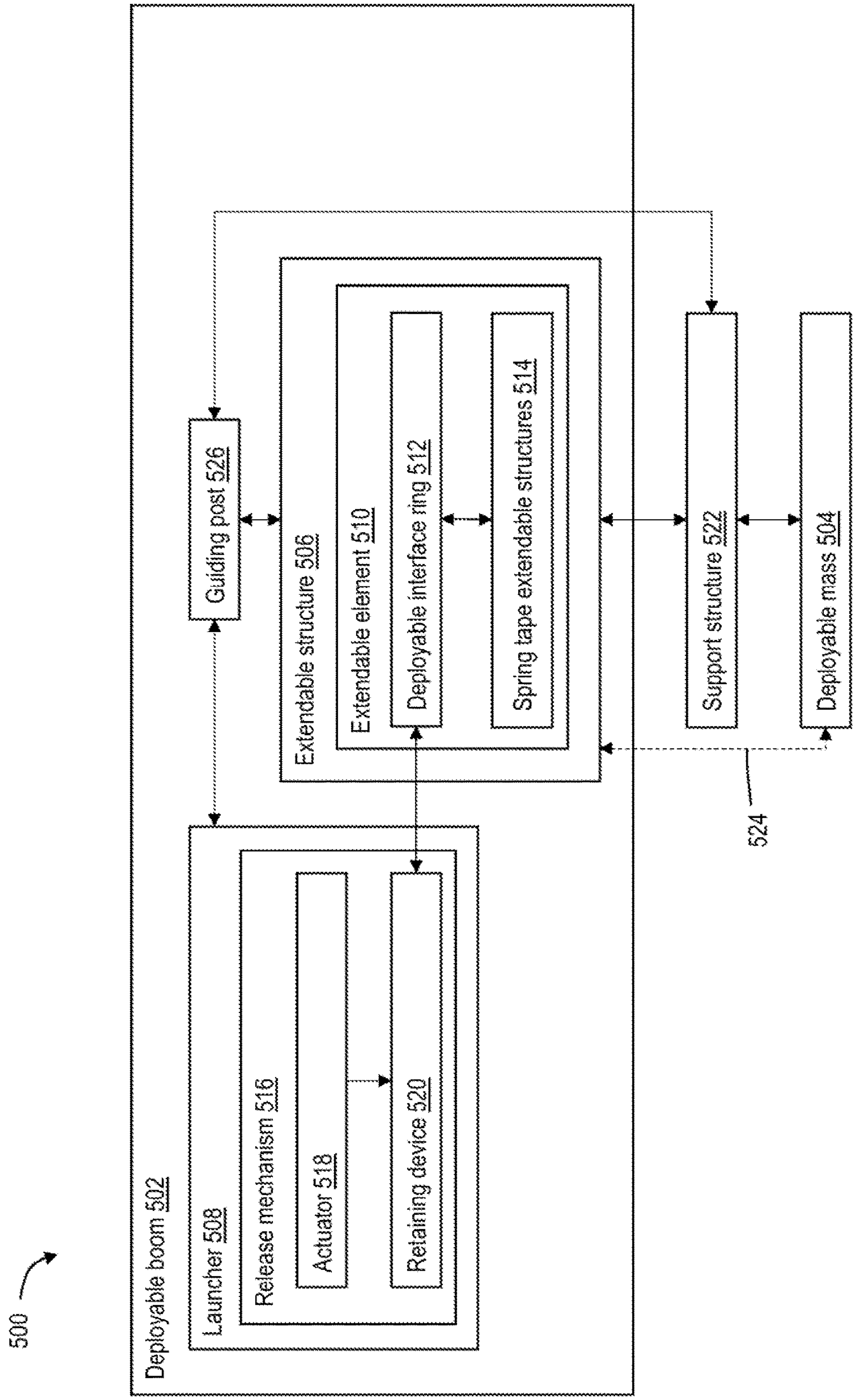
FIG. 5 is a block diagram of a system for deploying an extendable structure, according to an embodiment.

Referring now to FIG. 5, shown therein is a system 500 for deploying an extendable structure, according to an embodiment. Various interactions, interfacing, connections, or attachments between components of the system 500 are represented in FIG. 5 by arrowed lines.

The system 500 includes a deployable boom 502. The deployable boom 502 has a stowed (or non-deployed) configuration and a deployed configuration. The volume occupied by the deployable boom 502 in the stowed configuration is smaller than the volume occupied by the deployable boom 502 in the deployed configuration. The deployable boom 502 defines a deployment or boom axis. The deployable boom 502 is configured to deploy (i.e. extend) axially along the deployment axis. By deploying, the length of the deployable boom 502 is increased.

The system 500 also includes a deployable mass 504. Generally, the system 500 uses the deployable boom 502 to deploy or translate the deployable mass 504 along the deployment axis. The deployment of the deployable mass 504 may be considered passive in the sense that deployment of the deployable mass 504 is caused by the deployment of the deployable boom 502. Passive deployment of the deployable mass 504 may be achieved via directly or indirectly connecting or attaching the deployable mass 504 to the deployable boom 502.

The deployable mass 504 may be any mass or structure for which there is a desire or need to translate the mass or structure along the deployment axis of the deployable boom 502. In an embodiment, the deployable mass 504 is an antenna radiating element. The antenna radiating element may be a helical radiating element. In another embodiment, the deployable mass 504 may be a sensor device or a camera or vision system.

The deployable mass 504 may be an extendable mass. Such an extendable mass may have a stowed configuration and deployed configuration where the extendable mass has a smaller volume in the stowed configuration than in the deployed configuration. For example, the deployable mass 504 may have a fixed attachment point and an axially translated attachment point. Deployment of the deployable boom 502 may translate the axially translated attachment point of the extendable mass along the deployment axis while the fixed attachment point remains fixed, thereby extending the extendable mass. The extendable mass may have additional attachment points between the fixed attachment point and the axially translated attachment point. In an embodiment, the extendable mass may be an extendable helical radiating element of an antenna.

The deployable boom 502 includes an extendable structure 506 and a launcher 508 for deploying or extending the extendable structure 506.

The extendable structure 506 includes a plurality of extendable elements 510. The extendable elements 510 are connected to form a continuous structure along the deployment axis. For example, each extendable element 510 may be connected to at least one other extendable element 510. Each extendable element 510 has a stowed configuration and a deployed configuration. The extendable element 510 has a smaller volume in the stowed configuration than in the deployed or extended configuration. The extendable element 510 stores potential energy in the stowed configuration that is releasable to cause conversion of the extendable element 510 from the stowed configuration to deployed configuration (i.e. extension of the extendable element). The deployment of each extendable element 510 causes the extendable structure 506 to extend in length.

An extendable element 510 includes a deployable interface ring 512 and a at least one spring tape extendable structure 514 (or "spring tape 514" or "spring blade 514") fixed to the deployable interface ring 512. For example, the spring tapes 514 may be fixed or otherwise attached to the deployable interface ring 512 at the outer periphery of the deployable interface ring 512. The number of spring tapes 514 may be at least four. In an embodiment, the number of spring tapes 514 may be eight. In some embodiments, the extendable element 510 may be a single part. For example, the extendable element 510 may include a spring tape 514 made in one unified component. For example, the extendable element 510 may include a spring tape blade post and blade made of carbon fiber reinforced polymer on a mandrel. The spring tapes 514 are used to generate a translational force along the deployment axis and to provide a stiffness once in the deployed configuration. In some embodiments, the spring tapes 514 may be, without limitation, a spring steel, beryllium copper, or any composite material thereof.

The spring tapes 514 include a stowed configuration and a deployed configuration. In the stowed configuration, the spring tapes 514 store potential energy for deployment purposes. For example, the spring tapes 514 may be compressed, such as by bending or folding, to achieve the stowed configuration. Once deployed (i.e. the potential energy is released and the spring tape extends), the spring tapes 514 provide stiffness and strength to the extendable structure 506. The spring tapes 514 may be axisymmetrically around the deployment or boom axis. This may produce a translational deployment load along the axial direction of freedom of the deployable boom 502. The spring tapes 514 may provide an efficient extendable structure 506 as the spring tapes 514 perform multiple functions including energy storage in the stowed configuration and assembly stiffness when in the deployed configuration. The potential energy stored in the spring tapes 514 may be sufficient to ensure deployment under scenarios including friction and parasitic loads (e.g. worst case scenarios).

Generally, the spring tapes 514 of an extendable element 510 are fixed to and disposed between the deployable interface ring 512 and an adjacent ring. A first end of the spring tapes 514 is attached to the deployable interface ring 512 and a second end of the spring tapes 514 is attached to the adjacent ring. The deployable interface ring 512 is a structural component of the extendable structure 506 (e.g. ring) that gets deployed in the direction of extension along the deployment axis under the force of the spring tapes 514 connected thereto. The adjacent ring may be a deployable interface ring 512 of another extendable element 510 (e.g. a lower ring in the extendable structure 506) or may be a fixed structure (e.g. ring) that does not deploy (e.g. at a fixed end of the extendable structure 506). Where the extendable element 510 is the furthermost extendable element 510 in the direction of deployment (e.g. at the top of the extendable structure 506), the deployable interface ring 512 may be a structural support component or other structural element (e.g. a halo, as described herein) which is translated along the deployment axis upon deployment. In the stowed configuration, the spring tapes 514 are constrained between the deployable interface ring 512 and the adjacent interface ring by a retaining device (retaining device 520, described below) until release (freeing the deployable interface ring 512).

The launcher 508 is configured to deploy the extendable structure 506. The launcher 508 may be a sequential launcher for sequentially deploying the extendable elements 510 of the extendable structure 506. The launcher 508 may be a simultaneous launcher for simultaneously deploying the extendable elements 510 of the extendable structure 506.

The launcher 508 uses a release mechanism 516 to effect conversion of the extendable elements from the stowed configuration to the deployed configuration. Thus, the release mechanism 516 is configured to hold the extendable elements 510 in the stowed configuration and release the extendable elements, the release causing the conversion of the extendable elements 510 from the stowed configuration to the deployed configuration.

The release mechanism 508 includes an actuator 518 and a retaining device 520.

The retaining device 520 is configured to retain the extendable elements 510 in the stowed configuration. In particular, the retaining device 520 retains the deployable interface rings 512 in their respective stowed positions such that potential energy is stored in the spring tapes 514.

The retaining device 520 may include a hold down and release mechanism.

The retaining device 520 may retain the interface rings 512 in the stowed position directly, through direct contact with each interface ring 512, or indirectly (such as by retaining a halo component at the top or end of the extending end of the extendable structure 506).

The actuator 518 is operatively connected to the retaining device 520 for actuating the retaining device 520. The actuator 518 actuates the retaining device 520 (or some component thereof) to release the retaining device 520 and free the extendable elements 510. Once freed, the spring tapes 514 of a respective extendable element 510 release the stored potential energy, causing extension of the spring tapes 514, and the extendable element 510, from the stowed configuration to the deployed configuration. The actuator 518 may be a linear actuator. In an embodiment, the actuator includes a pin puller. It will be readily apparent that any type of actuator 518 may be used. Accordingly, the control scheme of the actuator may differ depending on the type of actuator 518. For example, the actuator may be, without limitation, a linear actuator, a rotary actuator, a spring/damper actuator, a high output paraffin pin puller actuator, or any combination thereof.

The actuator 518 may be configured to actuate a component of the retaining device 520 axially along the deployment axis in the direction opposite the direction of deployment or extension. Such actuation of the retaining device 520 may cause release or disengagement of some component of the retaining device 520 (e.g. ball bearings, Frangibolt™ or sepnut) previously retaining an extendable element 510 in the stowed configuration. The release or disengagement promotes the release of the stored potential energy in the spring tapes 514 and the extension of the extendable element 510.

Figure 17:
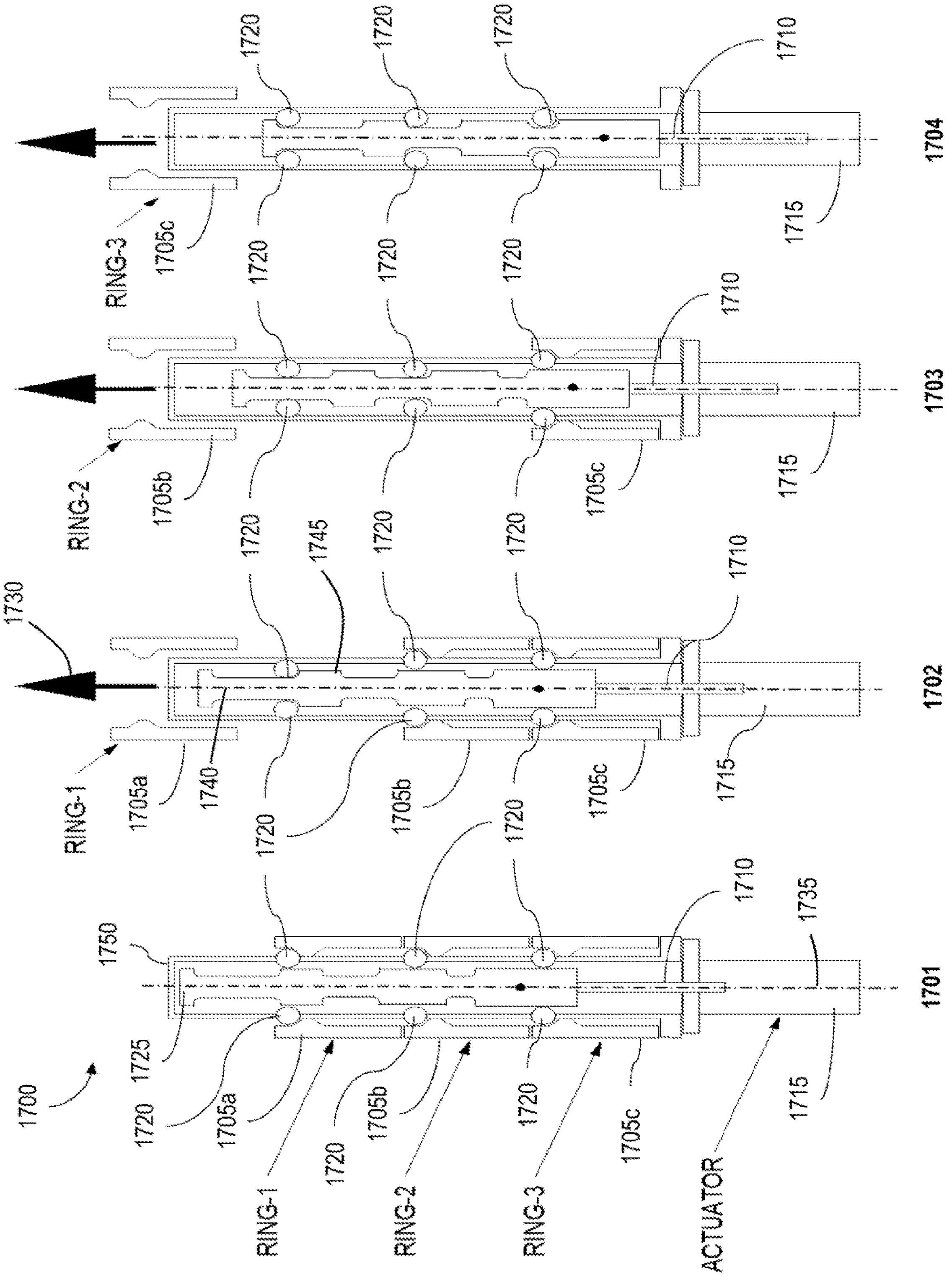
FIG. 17 is a schematic diagram illustrating a sequential deployment mechanism for sequentially deploying an extendable structure, according to an embodiment.

In an embodiment, the retaining device 520 includes a camshaft and ball bearings (see for example FIG. 17). The retaining device 520 may enable a sequential deployment of extendable elements 510. Each deployable interface ring 512 is retained by one or more ball bearings. In the stowed configuration, the ball bearings are captured between the camshaft, a launch tube of the deployable boom 502 (e.g. guiding post 526 or a portion thereof), and the deployable ring 512. The actuator 518 actuates the camshaft (e.g. via a pin puller pulling a pin connected to the camshaft) along the deployment axis in the direction opposite the direction of deployment to free the ball bearings retaining a first deployable interface ring 512. Once all bearings are freed from the first deployable interface ring 512, the first deployable interface ring 512 initiates its deployment under the force of the spring tapes 514. The actuator 518 provides the force to exert the relative movement between the camshaft and the launch tube to achieve the controlled deployment of the deployable interface ring 512. The process of deploying the first deployable interface ring 512 can then be repeated in sequence for each additional deployable interface ring 512 in the extendable structure 506. The order of ring 512 deployment allows all the rings 512 to deploy in a controlled fashion, including the last deployed ring 512. Spring tapes 514 between the freed ring 512 and the adjacent ring are constrained by the ball bearings until release.

Figure 18:
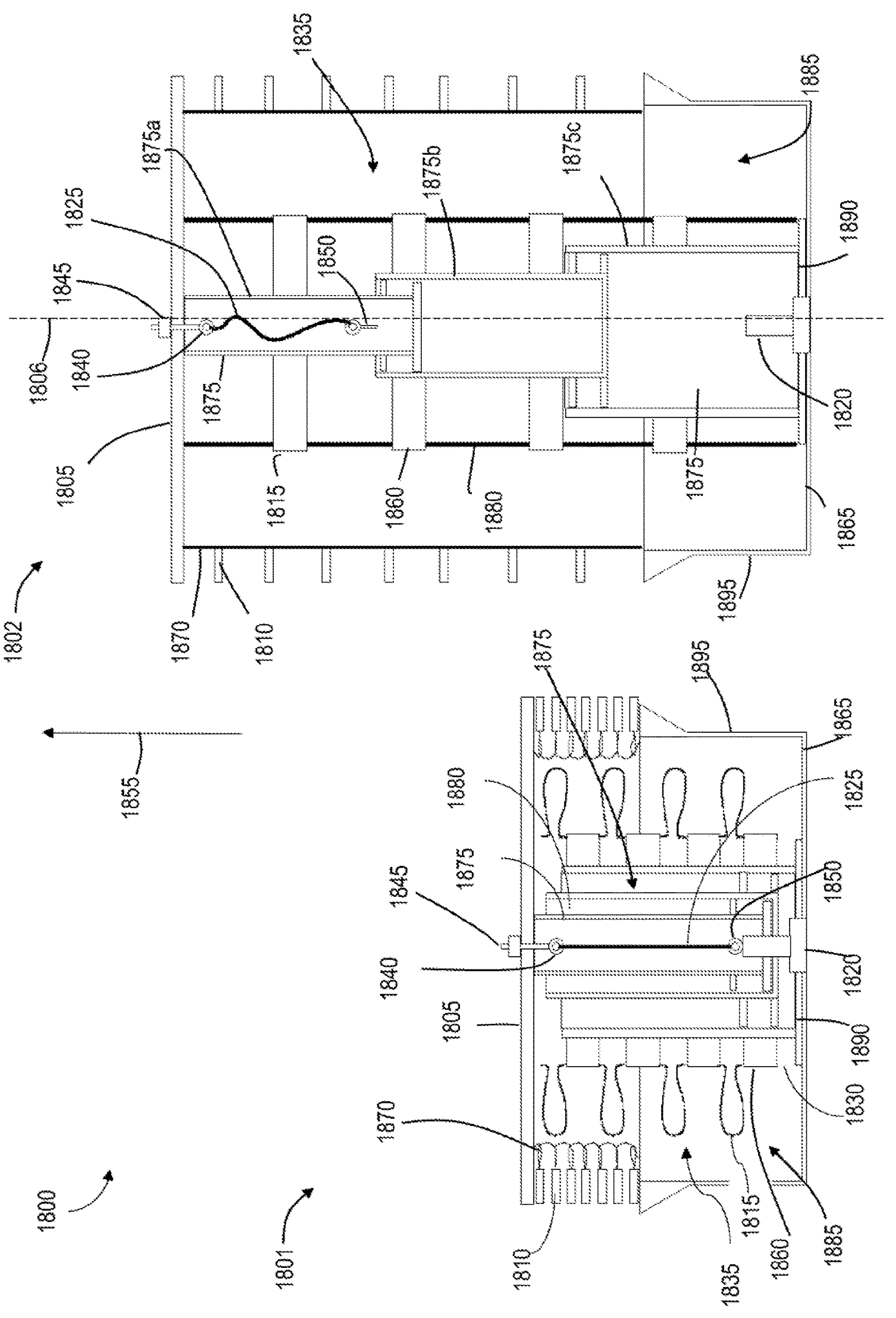
FIG. 18 is a schematic diagram illustrating a simultaneous deployment mechanism for deploying an extendable structure, according to an embodiment.

In another embodiment, the retaining device 520 includes a retaining wire and a Frangibolt, sepnut, or similar component (see for example FIG. 18). The retaining device 520 may enable a simultaneous deployment of extendable elements 510 and the release mechanism 516 may be a single release mechanism. The retaining wire includes a first end connected to a deploying end of the extendable structure 506 (e.g. attached to the deployable interface ring or other structural component furthermost at the deploying end) and a second end connected to a fixed end of the extendable structure 506 (e.g. a base ring or base support). The second end is connected to the Frangibolt or sepnut. The actuator 518 actuates a component of the retaining device to disengage the connection between the Frangibolt or sepnut and the retaining wire, causing the release of the retaining wire. Release of the retaining wire frees the extendable elements 510 to deploy along the deployment axis under the force of the spring tapes 514.

The system 500 also includes a support structure 522. The support structure 522, or components thereof, may be extendable. The extendable support structure 522 includes a stowed configuration and a deployed configuration. The extendable support structure 522 may be connected or attached to the extendable structure 506 such that the extendable support structure 522 extends (i.e. is deployed) passively as the extendable structure 506 is deployed.

The support structure 522 may constrain the deployable mass 504 (e.g. helical radiating element) along the axial and/or radial axes when the deployable mass 504 is deployed by the extendable structure 506. The support structure 522 may constrain the deployable mass 504 to ensure its out-of-axis positioning.

In an embodiment, the support structure 522 includes a skirt and a halo. The skirt may provide a support to the deployable mass 504 (e.g. helix) in the radial direction once deployed. The flexibility of the skirt may be minimized in the axial direction in the stowed state to minimize potential energy required for deployment.

The deployable mass 504 may be connected to the extendable structure 506 directly (represented by line 524) or may be connected to the extendable structure 506 indirectly through attachment to the support structure 522 (which is attached to the extendable structure 506.)

The deployable boom 502 also includes a guiding post 526. In some embodiments, the guiding post may not be present.

The guiding post 526 may be a launch tube. The guiding post 526 may be a telescopic post. The guiding post 526 may ensure that the deployment of the extendable structure 506 occurs along a single degree of freedom to ensure a reproducible behavior of the deployment dynamics. In a sequential deployment, the guiding post 526 may ensure that each stage of deployment (i.e. deployment of an extendable element 510) is guided by along the axial direction. In a simultaneous deployment, the guiding post 526 may be a telescopic post that guides the extendable structure 506 along the axial direction. The telescopic post may deploy with the same stored energy as the deployable boom 502. The telescopic post may function to guide the rings 512 along the radial direction.

The deployable boom 502 may be considered a passive deployable boom. The system 500 manages the release of the stored potential energy in the spring tapes 514 from the stowed to the deployed configuration. The deployable boom 502 promotes a controlled deployment by releasing the potential energy stored in the stowed system in the spring tapes 514 to the deployed configuration along the boom axial degree of freedom.

The deployable boom 502 may implement a sequential deployment to limit the maximal shock generated at the end of each stage of deployment (i.e. deployment of each extendable element 510).

The system 500 may provide deployment simplicity by using potential energy stored in the stowed system. In contrast, existing deployment systems (e.g. deployable antennas) require a motor to provide the energy to the system. The actuator 518 may be of minimal mass as the power that needs to be delivered to the system 500 is reduced compared to existing designs (e.g. using motors to provide energy). In a sequential deployment implementation, the actuator power required to release each stage of the extendable structure 506 sequentially is relatively low as actuation friction loads are minimized. The sequential deployment implementation of system 500 may provide relatively low shocks compared to a non-sequential deployment system. In a simultaneous deployment implementation, the deployment may be performed with the actuation of a single release mechanism. The simultaneous deployment implementation may produce shocks that are significant but repeatable, thus allowing the adjacent structure to be designed and qualified to the shock levels.

The deployment system 500 may provide controlled deployment of the release dynamic along the axial boom direction (deployment axis). This may promote or ensure repeatable deployment dynamics and on-earth testing.

For a long deployment boom 502 (e.g. equal to or longer than about 2 m), the stored energy may be released sequentially to ensure that each stage is guided by the guiding post 526 along the axial direction and that the shock generated by the energy release at the end of each deployment stage is limited. For short deployable booms (less than about 2 m), the stored energy may be released simultaneously while the extendable structure 506 is guided along the axial direction with a telescopic post (post 526) that deploys with the same stored energy as the deployable boom 502.

Figure 6:
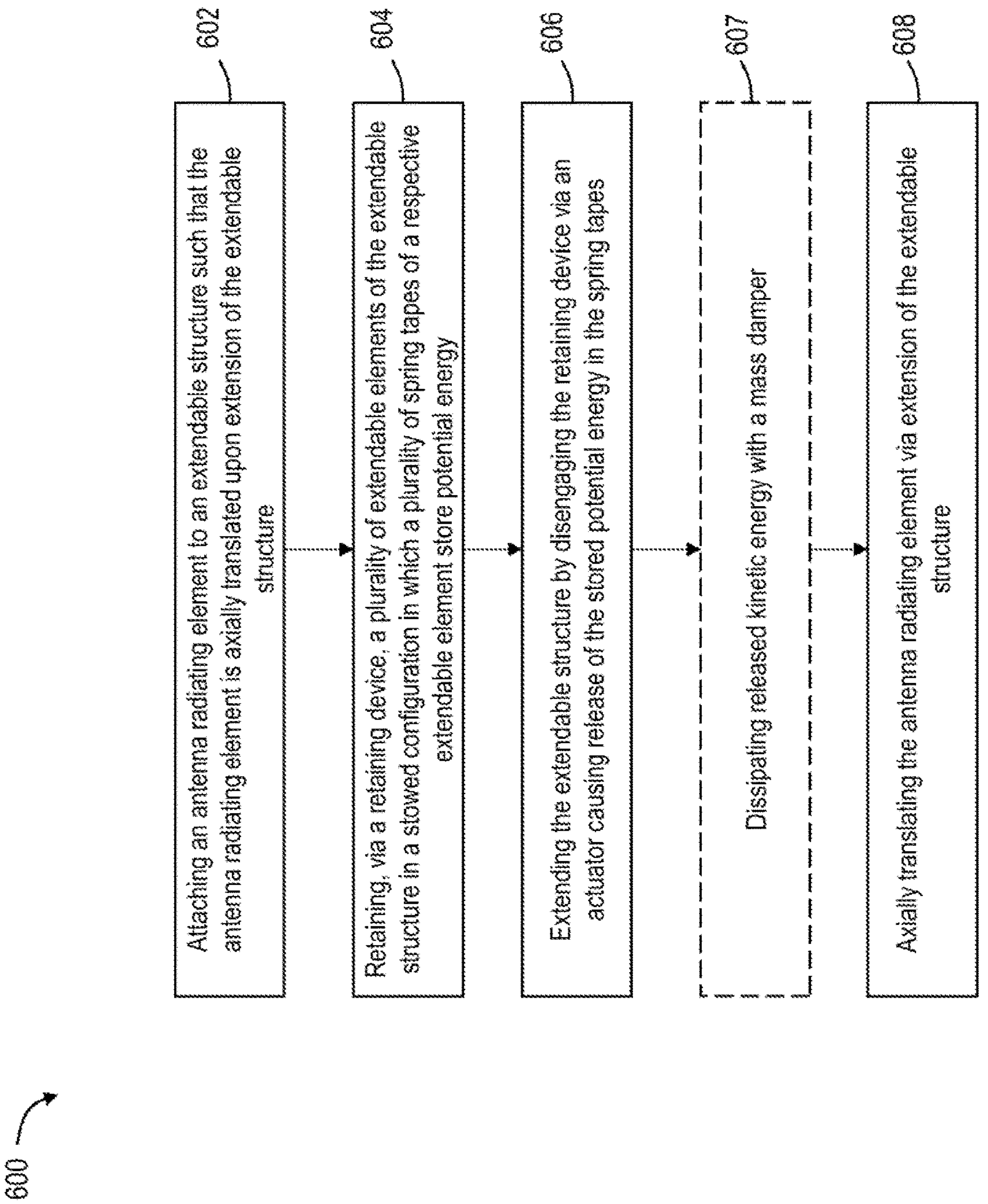
FIG. 6 is a flow diagram of a method of deploying a deployable antenna assembly, according to an embodiment.

Referring now to FIG. 6, shown therein is a method of deploying a deployable antenna assembly, according to an embodiment. The method 600 may be implemented using the system 500 of FIG. 5.

At 602, an antenna radiating element (e.g. deployable mass 504) is attached to an extendable structure (e.g. extendable structure 506) such that the antenna radiating element is axially translated upon extension of the extendable structure.

At 604, a retaining device (e.g. retaining device 520) is used to retain a plurality of extendable elements (e.g. extendable elements 510) of the extendable structure in a stowed configuration. In the stowed configuration, a plurality of spring tapes (e.g. spring tapes 514) of the extendable elements store potential energy.

At 606, the extendable structure is extended (or deployed) by disengaging the retaining device using an actuator (e.g. actuator 518). The actuator causes the retaining device to disengage, which causes the release of the potential energy stored in the spring tapes.

At 607, mass dampers are used to dissipate kinetic energy released while the extension (or deployment) of the extendable structure. The mass dampers may absorb vibrations and shock released by each of the extendable elements when each extendable element converts from the stowed configuration to the deployed configuration.

At 608, the antenna radiating element is axially translated along a deployment axis of the extendable structure via extension of the extendable structure. The axial translation of the antenna radiating element may thus be concurrent with the deployment of the extendable structure. As previously noted, the antenna radiating element may be connected directly to the extendable structure or indirectly through an extendable support structure (e.g. support structure 522) that is connected to the extendable structure. In this sense, the axial translation of the antenna radiating element can be considered passive as it is achieved through extension of the extendable structure. In cases where the antenna radiating element is an extendable radiating element (e.g. extendable helical radiating element), the axial translation includes extending the extendable radiating element.

Figure 7:
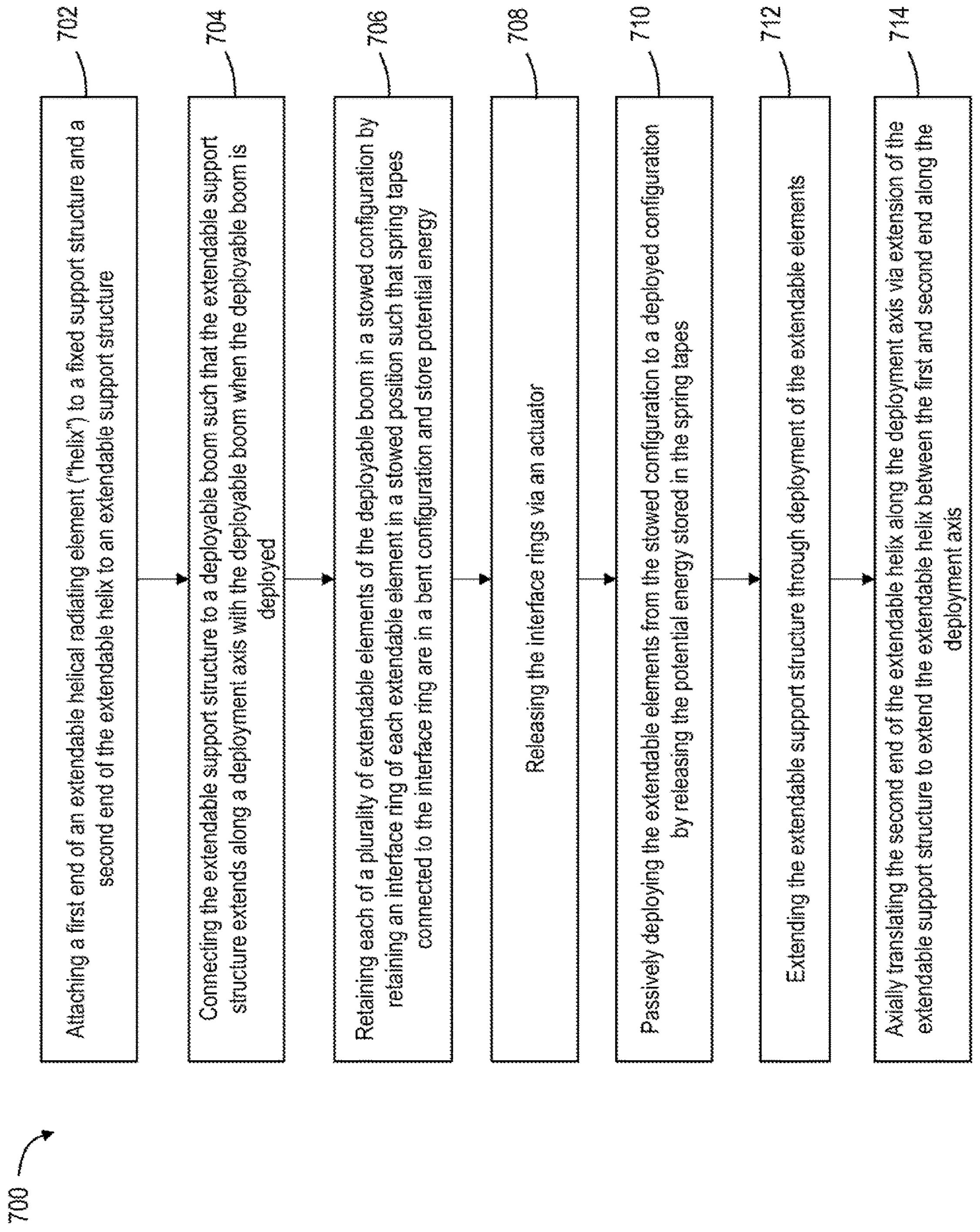
FIG. 7 is a flow diagram of a method of deploying an antenna assembly having a helical radiating element and a support structure, according to an embodiment.

Referring now to FIG. 7, shown therein is a method 700 of deploying an antenna assembly having a helical radiating element and a support structure, according to an embodiment. The method 700 may be performed by the deployment system 500 of FIG. 5. The helical radiating element may be the deployable mass 504 of FIG. 5 and the support structure may be the support structure 522 of FIG. 5.

At 702, a first end ("fixed end") of an extendable helical radiating element ("helix") is attached to a fixed support structure of the deployable antenna assembly and a second end ("axially translatable end") of the extendable helix is attached to an extendable support structure of the deployable antenna assembly. The extendable helix may be attached to the extendable support structure at additional attachment points in between the first end and second end.

At 704, the extendable support structure is connected to a deployable boom (e.g. deployable boom 502). The extendable support structure is connected to the deployable boom such that the extendable support structure extends along the deployment axis of the deployable boom when the deployable boom is deployed. As such, the extension of the extendable support structure can be considered passive as it is achieved through deployment of the deployable boom.

At 706, each of a plurality of extendable elements (e.g. extendable elements 510) of the deployable boom are retained in a stowed configuration. The extendable elements are each retained by an interface ring that is in a stowed position. In the stowed position, the interface ring constrains spring tapes connected to the interface ring (and an adjacent ring or structure) in a bent configuration. The spring tapes in the bent configuration store potential energy that can be released to deploy the deployable boom.

At 708, the interface rings are released via an actuator. The actuator may release the interface rings by releasing a retaining device. The interface rings may be release sequentially or simultaneously. In an embodiment, the actuator may actuate a camshaft, causing the displacement of ball bearings which, prior to displacement, retained the interface ring in the stowed position. In another embodiment, the actuator may cause a hold down and release mechanism to release, causing a single release of all the interface rings.

At 710, extendable elements that were constrained in the stowed configuration by the retained interface rings are passively deployed to a deployed configuration. The passive deployment is achieved by releasing the potential energy stored in the spring tapes.

At 712, the extendable support structure is extended through deployment of the extendable elements at 710. The extension of the extendable support structure is passive as it is a result of the connection of the extendable support structure to the deployable boom and deployment of the deployable boom. The extension or deployment of the extendable support structure may thus be concurrent with the deployment of the deployable boom (i.e. with 710).

At 714, the second end of the extendable helix is axially translated along the deployment axis via extension of the extendable support structure. The axial translation is achieved, in part, through the attachment at 702. Axial translation of the second end of the extendable helix causes extension of the extendable helix between the first and second end along the deployment axis.

Figure 8:
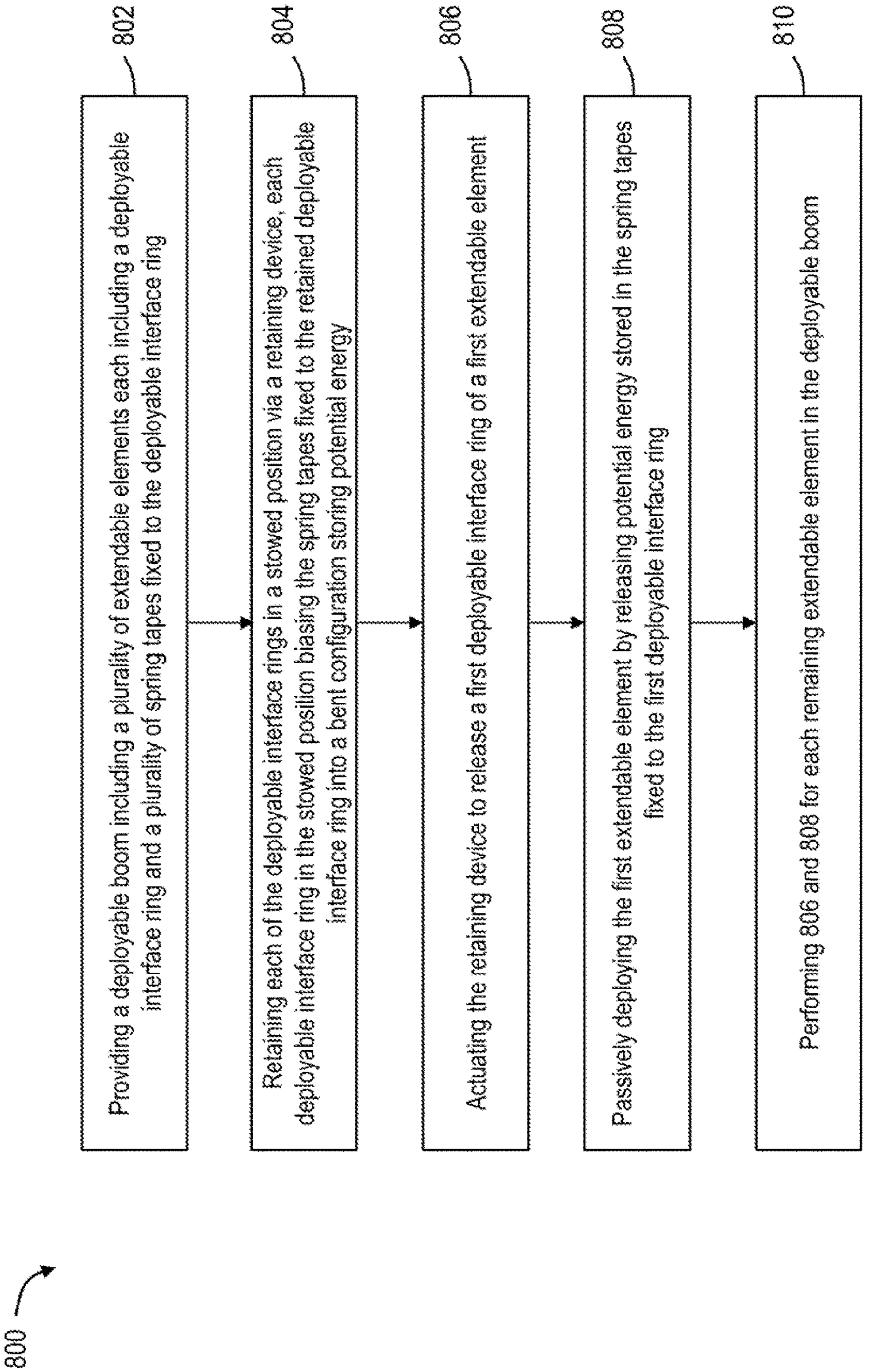
FIG. 8 is a flow diagram of a method of deploying an extendable structure using a sequential deployment technique, according to an embodiment.

Referring now to FIG. 8, shown therein is a method 800 of deploying an extendable structure using a sequential deployment technique, according to an embodiment.

The method 800 may be performed using the system 500 of FIG. 5.

At 802, a deployable boom is provided (e.g. deployable boom 502). The deployable boom includes a plurality of extendable elements. Each extendable element includes a deployable interface ring and a plurality of spring tapes attached to the deployable interface ring. The spring tapes are also attached to a second structural component, which may be the deployable interface ring of another extendable element, a fixed base ring or other base structure (e.g. at the bottom of the extendable structure).

At 804, each of the deployable interface rings is retained in a stowed position via a retaining device (e.g. retaining device 520). In the stowed position, the deployable interface ring biases the spring tapes fixed to the deployable interface ring into a bent or folded configuration that stores potential energy in the spring tape.

At 806, the retaining device is actuated to release a first deployable interface ring of a first extendable element. This may include, for example, actuating a camshaft to displace one or more ball bearing retaining the first deployable interface such that the first deployable interface ring is no longer retained (e.g. no longer constrained by or in contact with the ball bearings).

At 808, the first extendable element is passively deployed by the release of the potential energy stored in the spring tapes attached to the first deployable interface ring. The first deployable interface ring initiates its deployment under the force of the spring tapes. The spring tapes generate a translational force along the deployment axis.

At 810, steps 806 and 808 are repeated, sequentially, for each additional extendable element in the deployable boom. For example, the retaining device is further actuated to release a second deployable interface ring, and the second extendable element is passively deployed via the spring tapes.

Referring now to FIGS. 9 to 13 and 15 to 16, shown therein is a deployable antenna assembly 900, according to an embodiment. In an embodiment, the deployable antenna assembly 900 may be a deployable UHF antenna assembly. Various features, components, and functionality of the deployable antenna assembly 900 will now be described.

Figure 9:
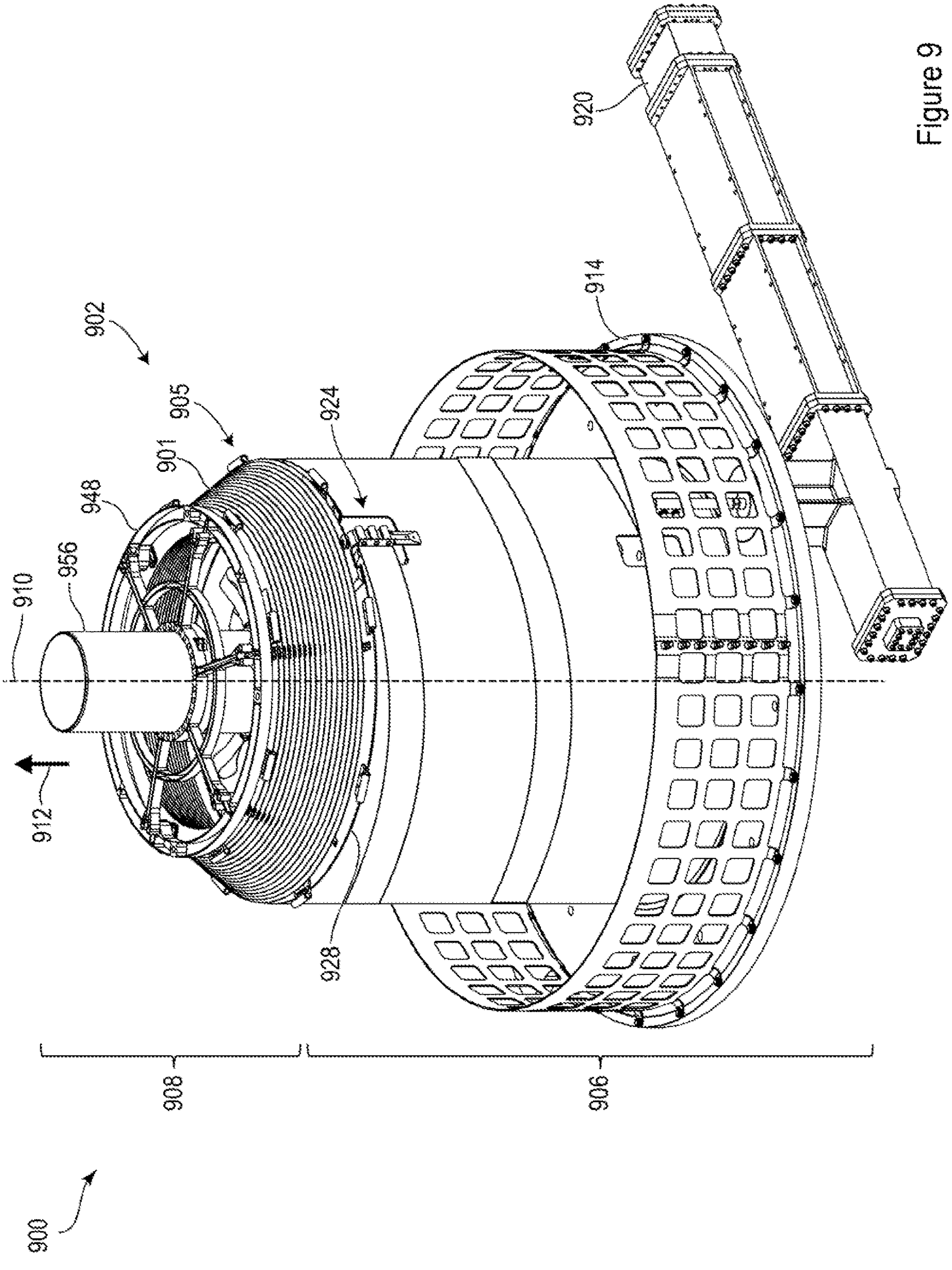
FIG. 9 is a perspective view of a deployable antenna assembly in a stowed configuration, in accordance with an embodiment.
Figure 10:
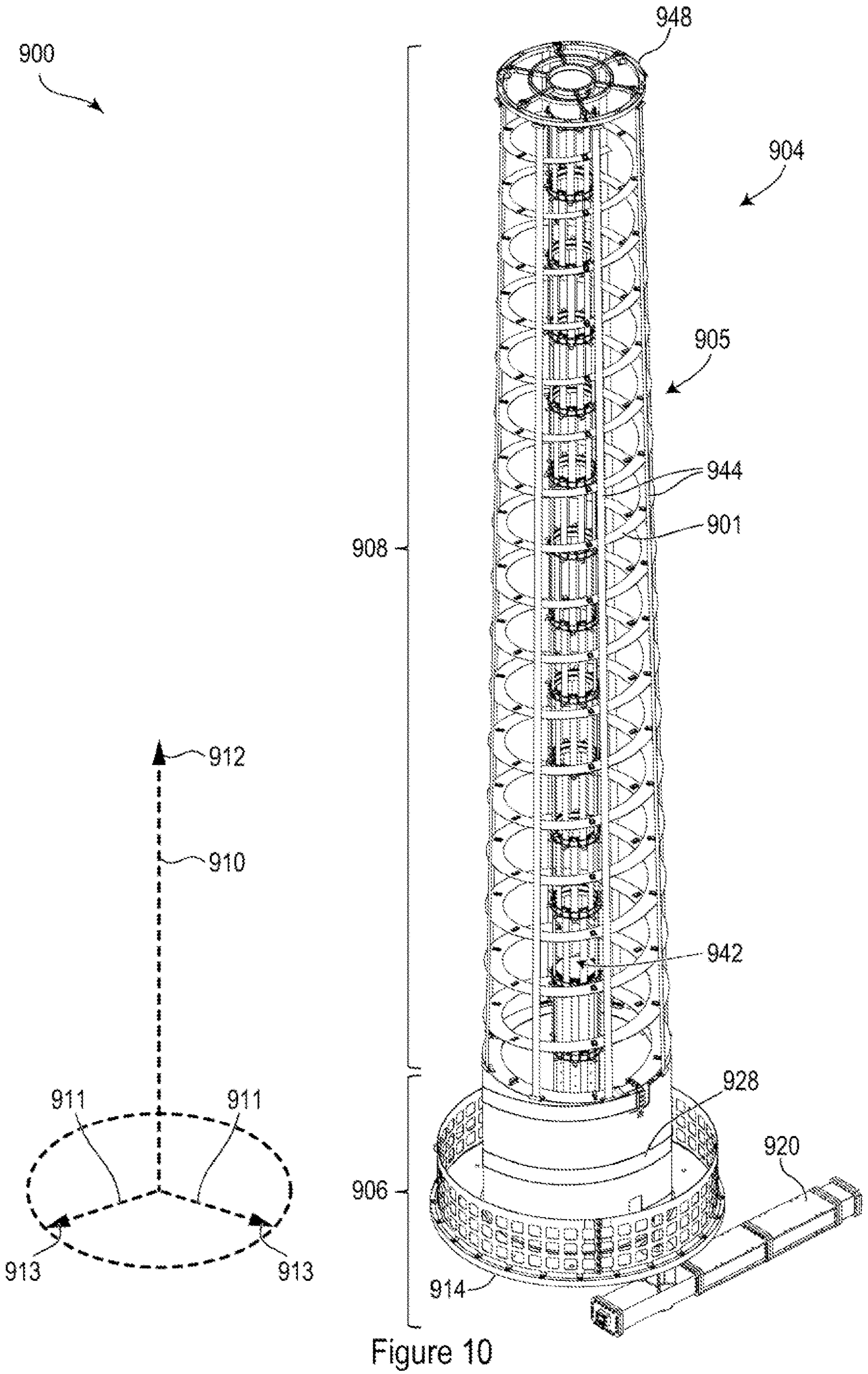
FIG. 10 is a perspective view of the deployable antenna assembly of FIG. 9 in a deployed configuration, according to an embodiment.

Referring now to FIGS. 9 and 10, shown therein is the deployable antenna assembly 900 in a stowed (non-deployed) configuration 902 (FIG. 9) and a deployed configuration 904 (FIG. 10).

The stowed configuration 902 is a fully stowed configuration (i.e. all extendable elements are in a stowed configuration) and the deployed configuration is a fully deployed configuration (i.e. all extendable elements are in a deployed configuration).

The assembly 900 includes a fixed section 906 and an extendable section 908. Upon deployment, the extendable section 908 extends along a deployment axis 910 (defined by a deployable boom, described below) in a deployment direction 912. The deployment direction 912 of the extendable section 908 is away from the fixed section 906.

Figure 11:
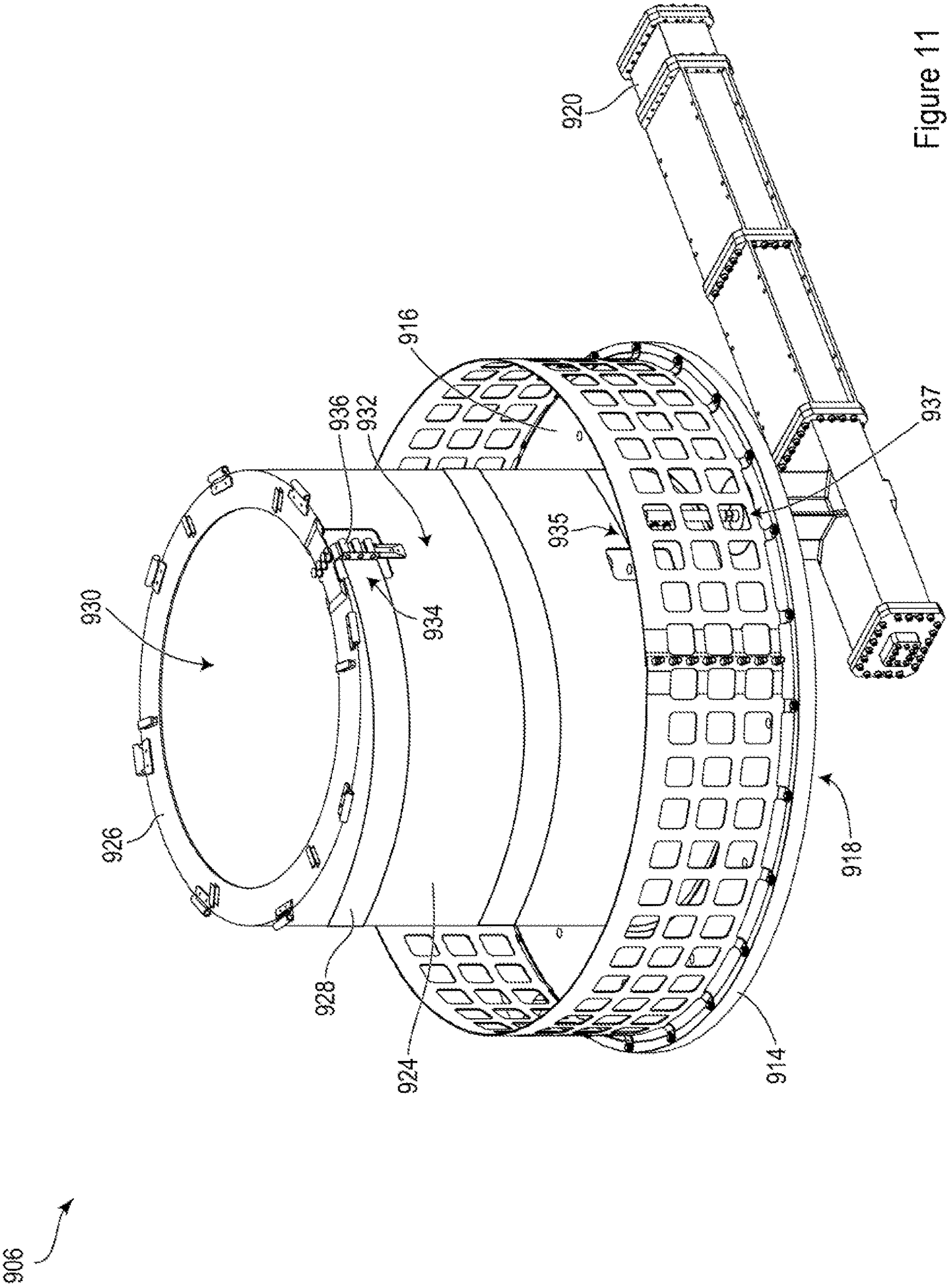
FIG. 11 is a perspective view of a fixed section of the deployable antenna assembly of FIGS. 9 and 10 in isolation, according to an embodiment.
Figure 12:
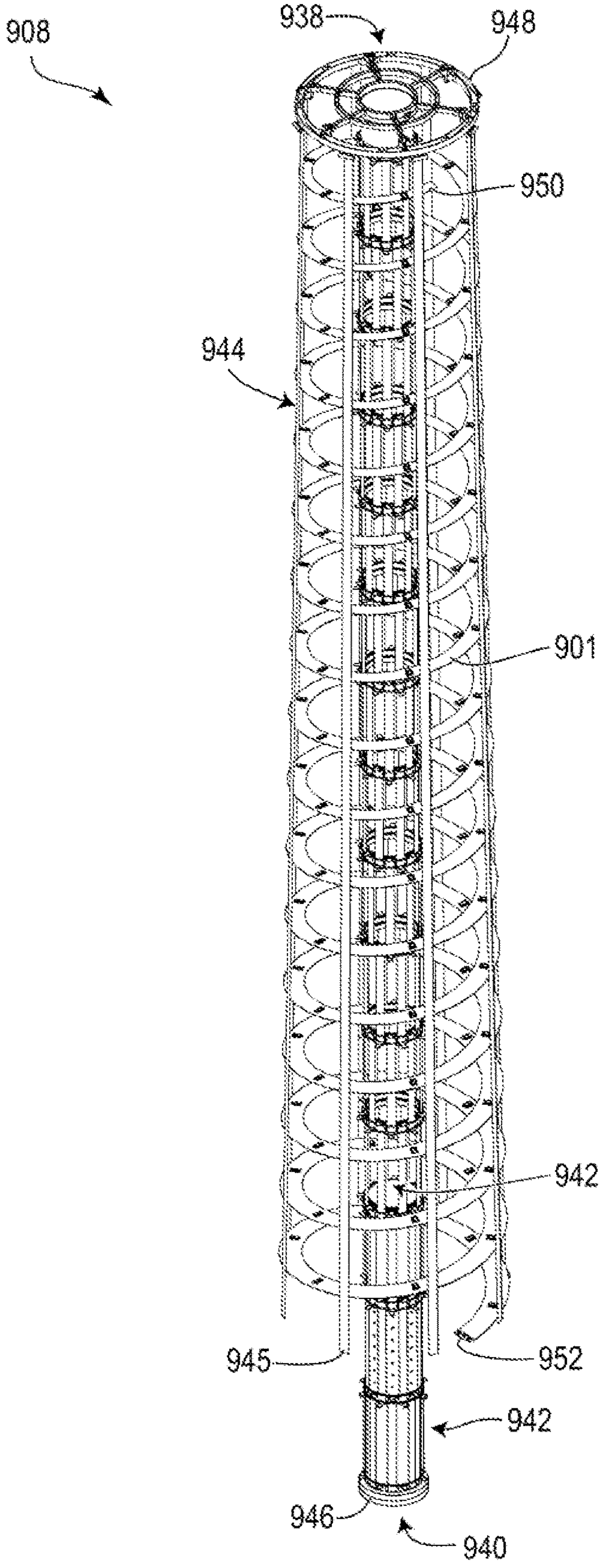
FIG. 12 is a perspective view of an extendable section of the deployable antenna assembly of FIG. 10 in isolation, according to an embodiment.

The fixed section 906 of the assembly 900 is shown in isolation in FIG. 11. The extendable section 908 of the assembly 900 is shown in isolation in FIG. 12.

The assembly 900 includes a helical radiating element ("helix"). The helical radiating element 905 includes an extendable helix 901 connected to a fixed helix 928. The helix 901, 928 is configured to transmit or receive RF signals. The RF signals may be of a predetermined signal frequency band. The signal frequency band may be a UHF signal frequency band.

The fixed section 906 includes a base cup 914. The base cup 914 includes a first surface 916 and a second surface 918 opposing the first surface 916.

The fixed section 906 includes a transmission line housing 920 which houses a transmission line carrying the RF signal to and from the helical radiating element 905.

The fixed section 906 includes a rigid helix support 924. The rigid helix support 924 is cylindrical in shape. The rigid helix support 924 supports an extendable helix 901 and a fixed helix 928.

The rigid helix support 924 includes a first surface 926, a second surface opposing the first surface 926 (not visible), and an exterior surface 932. The rigid helix support 924 includes an inner cavity 930. The inner cavity 930 receives a portion of the extendable section 908 of the assembly 900. The inner cavity 930 may extend the length of the rigid helix support 924 from the first surface 926 to the second surface (not shown).

The second surface of the rigid helix support 924 is mounted to the first surface 916 of the base cup 914.

The first surface 926 of the rigid helix support 924 provides an attachment surface for an extendable helix and for a skirt (support structure). The rigid helix support 924 includes skirt connectors 930 disposed on the first surface 926 for connecting the skirt elements to the rigid helix support 924 (and thus to the fixed section 906). Includes extendable helix connectors for connecting the extendable helix to the top surface of the fixed section. Includes an extendable helix termination point.

The fixed section includes the fixed helix 928. The fixed helix 928 is disposed on the exterior surface 932 of the rigid helix support 924. The fixed helix 928 includes a first end 934 and a second end 935. The fixed helix 928 extends from the first end 934 to the second end 935.

The first end 934 of the fixed helix 928 connects to a fixed helix-extendable helix connection point 936. The connection point 936 facilitates signal transmission from the extendable helix 901 to the fixed helix 928 or vice versa.

The second end 935 of the fixed helix 928 connects to a fixed helix-transmission line connection (not visible) for signal transmission from the fixed helix 928 to the transmission line or vice versa. The fixed helix-transmission line connection point traverses a helix-transmission line connection area 937 of the base cup 914. The connection area 937 enables the connection to traverse the base cup 914 (between first 916 and second surfaces 918) to the transmission housing 920.

Referring now to the extendable section 908 (shown in isolation in FIG. 12), the extendable section 908 includes a first end 938 and a second end 940.

The extendable section 908 includes a deployable boom (or extendable pillar) 942, a support structure including a skirt 944 and a halo 948, and the extendable helix 901.

The second end 940 of the deployable boom 942 is disposed in the interior cavity 930 of the rigid helix support 924. The deployable boom 942 includes a base ring 946 at the second end 940, which is mounted or otherwise attached to the first surface 916 of the base cup 914. The base ring 946 thus attaches the deployable boom 942 to the fixed section 906 of the assembly 900.

The halo 948 is attached to the deployable boom 942 near the first end 938 of the extendable section 908. The halo 948 provides support for the extendable helix 901 by providing a rigid attachment point for the skirt 944.

The skirt 944 includes a plurality of skirt elements 945. The skirt elements 945 attach to the halo 948 at the first end 938 of the extendable section 908 and extend towards the second end 940 of the extendable section 908, where the skirt elements 945 attach to the first surface 926 of the rigid helix support 924, thus connecting the skirt 944 to the fixed section 906. The skirt elements 945 are extendable in the deployment direction 912 and have a stowed configuration and a deployed configuration. In some embodiments, flex blades may positioned between the halo 948 and the skirt 944 to precharge the skirt 944 and reduce lateral deviations of the extendable helix 901 in orbit.

The extendable helix 901 includes a first end 952 proximal the base ring 946 and a second end 950 proximal the halo 948. The first end 952 of the extendable helix 901 is connected to the first end 934 of the fixed helix 928 at the fixed helix-extendable helix connection point 936. The second end 950 of the extendable helix 901 is connected to the skirt 944 at the first surface 926 of the fixed section 906. Generally, the first end 952 of the extendable helix 901 is fixed and the second end 950 of the extendable helix 901 is axially translatable in the deployment direction 912 along the deployment axis upon deployment of the deployable boom 942. The extendable helix 901 is also attached to the skirt elements 945 at additional attachment points along the length of the extendable helix 901.

Generally, the deployable boom 942 is configured to extend in the deployment direction 912 along the deployment axis 910 when converting from the stowed configuration 902 to the deployed configuration 904. Extension of the deployable boom 942 drives the halo 948 in the deployment direction 912. The skirt elements 945, which are connected at one end to the halo 948, are extended as the halo 948 moves in the deployment direction 912. The extendable helix 901, which is connected to the skirt elements 945, extends in the deployment direction 912 as the skirt elements 945 extend.

Figure 13:
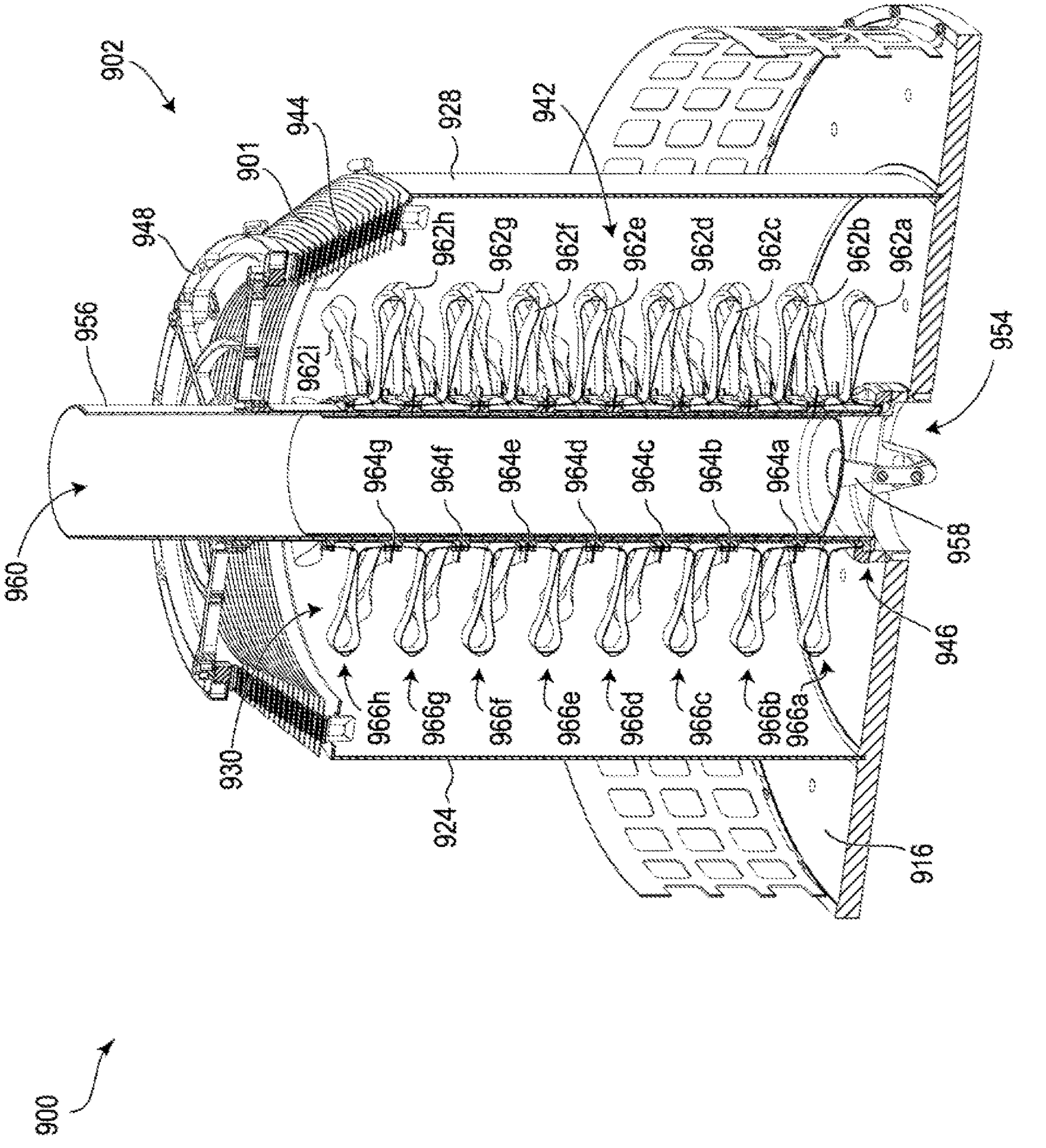
FIG. 13 is a partial cross-sectional perspective view of the deployable antenna assembly of FIG. 9, according to an embodiment.

Referring now to FIG. 13, a cross-sectional view of the antenna assembly 900 in the stowed configuration 902 is shown.

The deployable boom 942 is shown disposed in the interior cavity 930 of the rigid helix support 924. The deployable boom 942 is attached to the first surface 916 of the base cup 914 via the base ring 946. The base ring 946 is mounted to the base cup 914 at an aperture 954 in the base cup 914.

The deployable boom 942 includes a launch tube 956. The launch tube 956 is attached to the base ring 946, which attaches the launch tube 956 to the base cup 914 (and fixed section 906). The launch tube 956 includes an interior cavity 960.

The deployable boom 942 includes a launcher 958. The launcher 958 is disposed in the interior 960 of the launch tube 956. The launcher 958 initiates conversion of the extendable elements from a stowed configuration to a deployed configuration (which correspond with the stowed configuration 902 and the deployed configuration 904 of the assembly 900).

The deployable boom 942 further includes a plurality of extendable elements 966. Each extendable element 966 includes an interface ring 964 and a plurality of spring tape extendable structures 962 fixed to the interface ring 964.

The interface rings 964*a*, 964*b*, 964*c*, 964*d*, 964*e*, 964*f*, 964*g* are disposed around the launch tube 956. The interface rings 964*a*, 964*b*, 964*c*, 964*d*, 964*e*, 964*f*, 964*g* have a stowed position (shown in FIG. 13) and a deployed position (which is assumed in the deployed configuration 904).

The number of spring tapes attached to the interface rings in FIG. 13 is eight. In other embodiments, the number of spring tapes attached to the interface rings may vary. For example, the number of spring tapes 962 may be at least four. The spring tapes 962*a*, 962*b*, 962*c*, 962*d*, 962*e*, 962*f*, 962*g*, 962*h*, 962*i* are arranged axisymmetrically around the deployment axis (deployable boom).

Generally, the spring tapes 962 attach to the interface ring 964 which is part of the same extendable element at one end and an adjacent ring (which is considered the interface ring of the extendable element below) at the other end. In the case of the spring tapes proximal to the base cup 914, the spring tapes may attach to an interface ring 964 at one end and the base ring 946 at the opposing end.

Generally, in the stowed configuration 902, the interface rings 964 are retained by a retaining device (not shown) in the stowed position, which constrains the spring tapes 962 between the retained interface ring and the adjacent ring into a folded or bent configuration. The spring tapes 962 in the stowed configuration store potential energy that can be released to cause extension of the deployable boom 942.

To initiate deployment of the deployable boom 942, and conversion of the assembly 900 from the stowed configuration 902 to the extended configuration 904, the launcher is actuated opposite the direction of deployment 912. Actuation of the launcher 958 causes the retaining device to disengage, which releases the interface rings 964. The free interface rings 964 are deployed in the deployment direction 912 via release of the potential energy stored in the spring tapes 962. Deployment of the interface rings 964, and extension of the spring tapes 962, deploy the deployable boom 942 along the deployment axis 910. Extension of the deployable boom 942 causes deployment of the skirt 944 and the extendable helix 901.

The launcher 958 initiates extension of each of the spring tapes 962*a*, 962*b*, 962*c*, 962*d*, 962*e*, 962*f*, 962*g*, 962*h*, 962*i* to transition from a folded shape (as shown) to a fully extended shape that is parallel to the deployment axis 910, thereby extending the respective extendable element as the extendable element converts from a stowed configuration to a deployed configuration.

The extension translation/displacement of the interface ring of the extendable element causes release of potential energy that is stored in the spring tapes 962 of the extendable element 966 when in the folded (stowed) shape. Accordingly, release of a plurality of spring tapes 962 in a sequential manner provides improved stability during deployment and release of the stored potential energy.

In some embodiments, the launcher 958 sequentially initiates the conversion of each of the extendable elements 966*a*, 966*b*, 966*c*, 966*d*, 966*e*, 966*f*, 966*g*, 966*h*. The sequential extension of spring tapes 962 enables the deployment of the extendable helix 901 to be a low-shock deployment, which may reduce the risk of damage or other unwanted or adverse effect caused by an excessively forceful deployment. When all of the extendable elements 966 are in the deployed configuration, the extendable helical radiating element 905 is fully deployed (deployed configuration 904).

In some embodiments, release of the extendable elements 966 may be sequential. In other embodiments, the release of the extendable elements 966 may be simultaneous.

In some embodiments, the antenna 900 may be a long deployable antenna (longer than about 2 m in the axial direction when in the deployed configuration, e.g. 2-4 m). Long deployable antenna assemblies, such as a deployable antenna assembly that is longer than 2 m in the axial direction 912, may be released sequentially. Sequential release of the long deployable antenna assembly may ensure that each stage is guided by a post (e.g. launch tube 956) along the axial direction and that the shock generated by the energy release resulting from the deployment of the extendable element 966 is limited.

In some embodiments, the antenna 900 may be a short deployable antenna (shorter than about 2 m in the axial direction when in the deployed configuration). In some cases, a short deployable antenna may be configured to implement a simultaneous deployment in which all extendable elements 966 in the deployable boom deploy simultaneously upon initiation by the launcher 958. In some embodiments, the release of each of the spring tapes 962*a*, 962*b*, 962*c*, 962*d*, 962*e*, 962*f*, 962*g*, 962*h*, 962*i* is simultaneous. Accordingly, the launcher 958 may simultaneously initiate the conversion of each of the extendable elements 966*a*, 966*b*, 966*c*, 966*d*, 966*e*, 966*f*, 966*g*, 966*h* from the stowed configuration 902 to the deployed configuration 904.

Short deployable antenna assemblies, such as a deployable antenna assembly that is shorter than 2 m in the axial direction, may be released simultaneously while the deployable antenna assembly is guided along the axial direction with a telescopic post that deploys with the same stored energy as the deployable antenna assembly.

The deployable boom 942 uses spring tapes 962 to generate a translational force along the deployment axis 910 and to provide stiffness once the extendable elements 966 are in the deployed configuration. The spring tape may be fixed to interface rings 964 at approximately every 8 inches along the deployable boom 942.

In the stowed configuration, the spring tapes 962 of the expandable elements 966 store potential energy for the purpose of deployment. Once deployed, the spring tapes 962 provide stiffness and strength to the deployable antenna assembly. The axial stiffness may be increased by at least 2 orders of magnitude when the spring tapes 962 are in the deployed configuration compared to the stowed configuration. The deployed stiffness may be linear over a large range of axial or bending loads applied on the spring tapes 962.

While the spring tapes 962 may be used to provide loads around a rotational degree of freedom, the axisymmetric assembly of the spring tapes 962 around the deployment axis 910 produces a translational deployment load along the axial direction 912 of the deployable boom 942.

Figure 14:
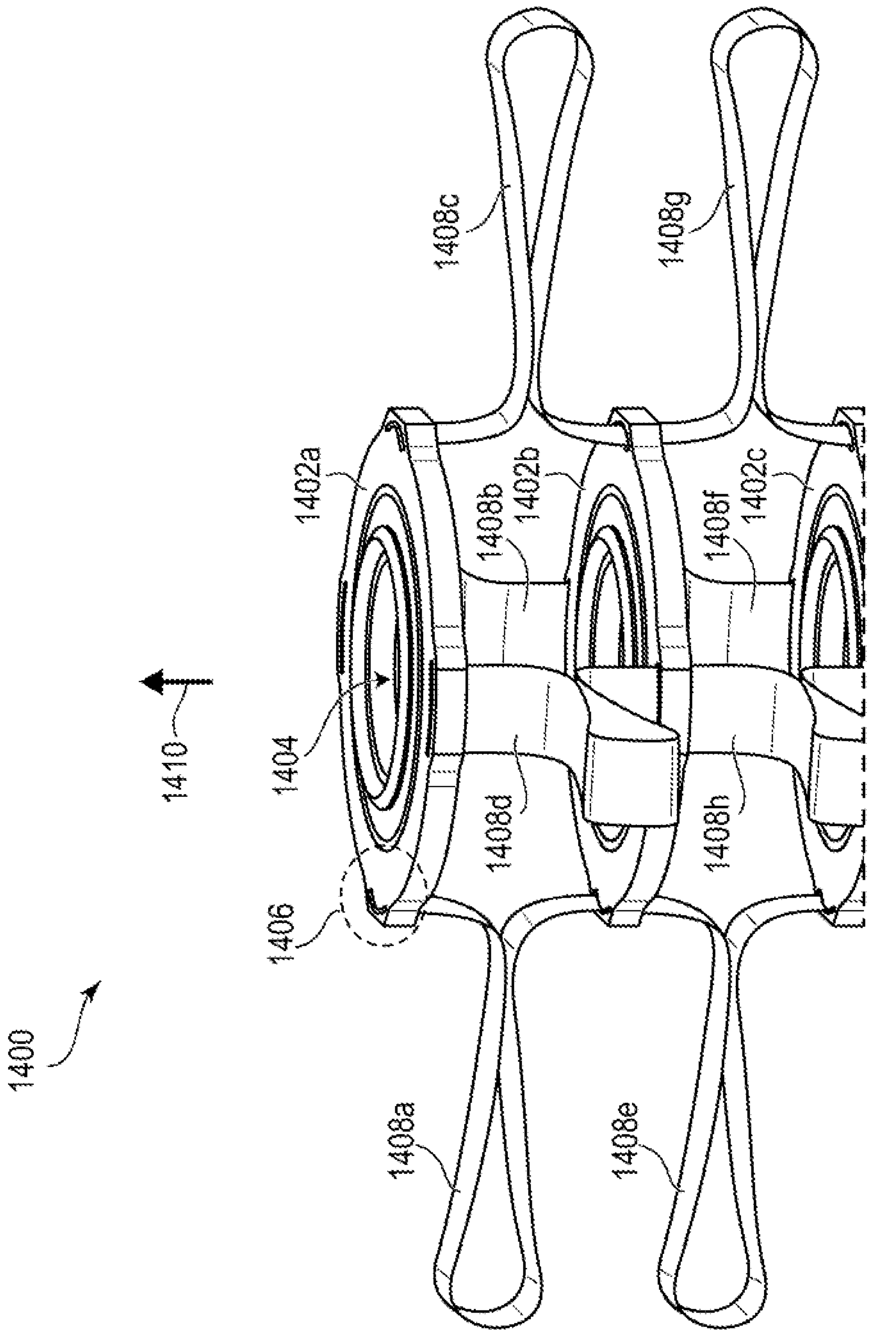
FIG. 14 is a perspective view of a plurality of extendable elements of an extendable section of a deployable antenna assembly in isolation, the plurality of extendable elements in a stowed configuration, according to an embodiment.

Referring now to FIG. 14, shown therein is a plurality of extendable elements 1400 of an extendable section (e.g. extendable section 908) of a deployable antenna assembly (e.g. assembly 900) in isolation, according to an embodiment. In particular, the extendable elements 1400 form part of a deployable boom (or extendable pillar). The extendable elements 1400 are illustrated in a stowed configuration. In the stowed configuration as part of a deployable boom, the extendable elements are retained in the stowed configuration by a retaining device (not shown in FIG. 14).

The extendable elements 1400 in FIG. 14 represent a variant of the extendable elements shown in FIG. 13. In particular, extendable elements 1400 vary in the number of spring tape extendable structures per interface ring (four in FIG. 14 versus eight in FIGS. 9-13).

The extendable elements 1400 include interface rings 1402*a*, 1402*b*, and 1402*c*. Interface rings 1402*a*, 1402*b*, 1402*c* are referred to collectively as interface rings 1402 and generically as interface ring 1402. Each interface ring 1402 includes an aperture 1404 through which a launch tube (e.g. launch tube 956 of FIGS. 9-13) is disposed.

Each interface ring 1402 includes a plurality of spring tape attachment points 1406 for attaching spring tape extendable structures to the interface ring 1402.

The extendable elements 1400 include spring tape extendable structures (or spring tapes) 1408*a*, 1408*b*, 1408*c*, 1408*d*, 1408*e*, 1408*f*, 1408*g*, 1408*h* referred to collectively as spring tapes 1408 and generically as spring tape 1408. The spring tapes 1408 are in a stowed configuration in which the spring tapes 1408 are folded or bent. In the stowed configuration, the spring tapes 1408 store potential energy that can be released to extend the extendable elements 1404 in deployment direction 1410.

The spring tapes 1408*a*-1408*d* are attached to interface ring 1402*a* at a first end and to interface ring 1402*b* at a second end opposing the first end. The spring tapes 1408*a*-1408*d* are attached to the interface rings 1402*a*, 1402*b* via connections at attachment points 1406.

The spring tapes 1408*e*-1408*h* are attached to interface ring 1402*b* at a first end and to interface ring 1402*c* at a second end opposing the first end. The spring tapes 1408*e*-1408*h* are attached to the interface rings 1402*b*, 1402*c* via connections at attachment points 1406.

The spring tapes 1408 are attached to the interface rings 1402 such that the spring blades 1408 are arranged axisymmetrically about a boom axis.

As described herein, an extendable element (or extendable section or extendable unit), unless otherwise stated, refers to a plurality of spring tapes 1408 and the interface ring 1402 to which those spring tapes 1408 are attached which deploys in deployment direction 1410 under the translational force of the spring tapes 1408. For example, interface ring 1402*a* and spring tapes 1408*a*-1408*d* form an extendable element as interface ring 1402*a* deploys in deployment direction 1410 under the translational force of spring tapes 1408*a*-1408*d* upon release of the stored potential energy in spring tapes 1408*a*-1408*d*.

Generally, in the stowed configuration, the spring tapes 1408*a*-1408*d* are constrained in a folded configuration by and between interface rings 1402*a*, 1402*b* and the spring tapes 1408*e*-1408*h* are constrained in a folded configuration by and between interface rings 1402*b*, 1402*c*. The interface rings 1402*a*, 1402*b* are retained in the stowed position by a retaining device (not shown). Upon release of the retaining device (e.g. by an actuator component of a launcher), the interface rings 1402*a* and 1402*b* are freed and the spring tapes 1408*a*-1408*h* extend. Interface ring 1402*c* may also deploy similarly to interface rings 1402*a*, 1402*b* if interface ring 1402*c* has spring tapes attached thereto below the interface ring 1402*c* (opposite the deployment direction 1410).

Figure 15A:
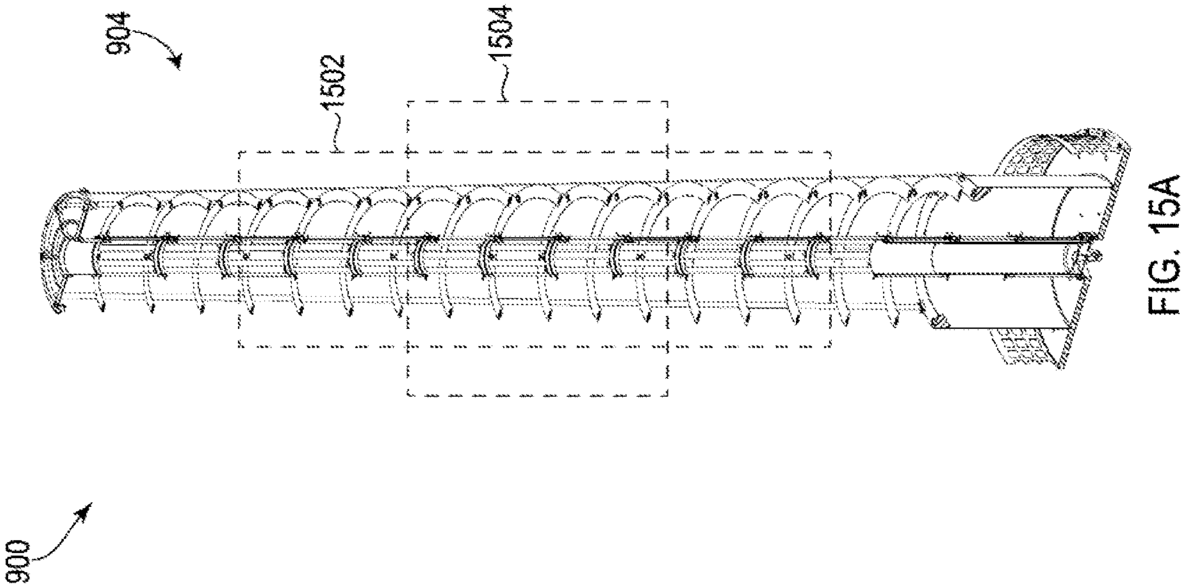
FIG. 15A is a partial cross-sectional perspective view of the deployable antenna assembly of FIG. 10, according to an embodiment.
Figure 15B:
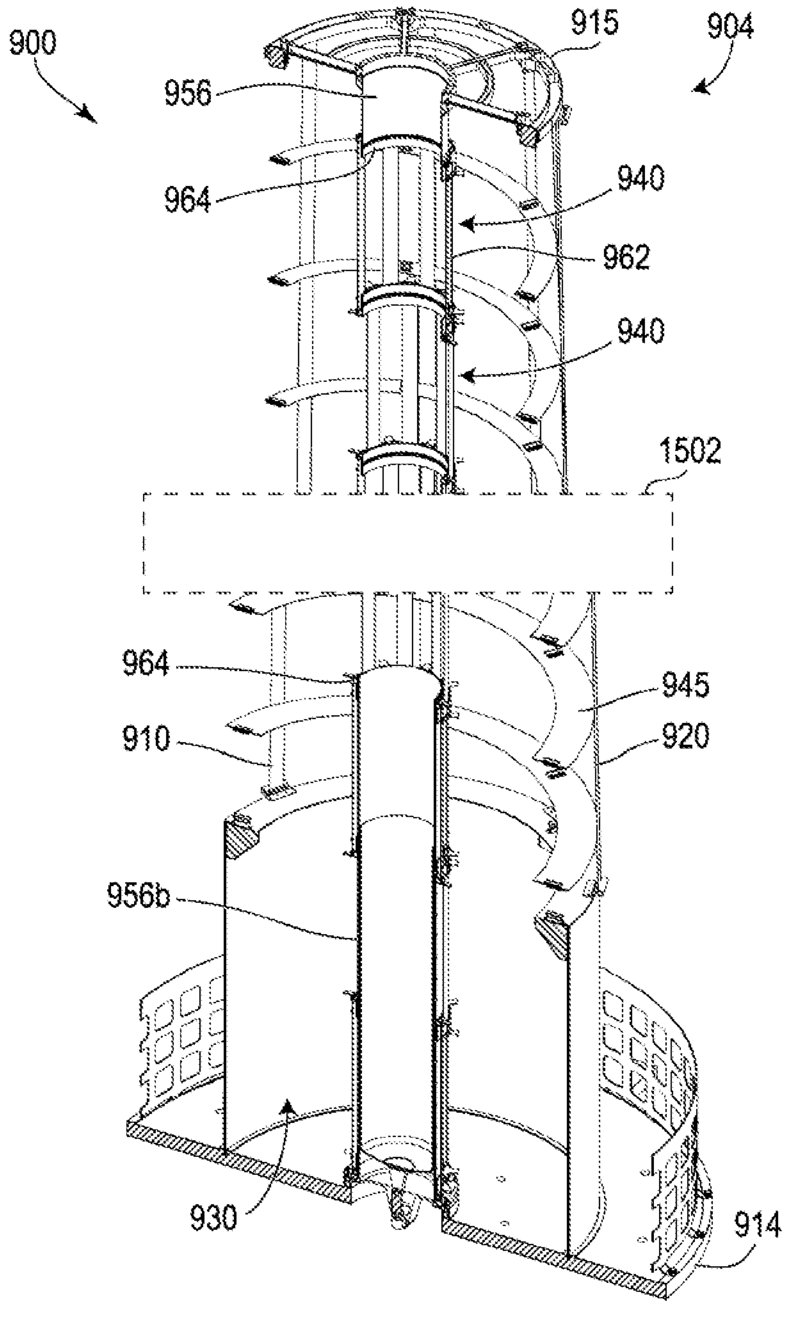
FIG. 15B is a close-up view of FIG. 15A with a portion of the extendable section of the deployable antenna assembly omitted.
Figure 16:
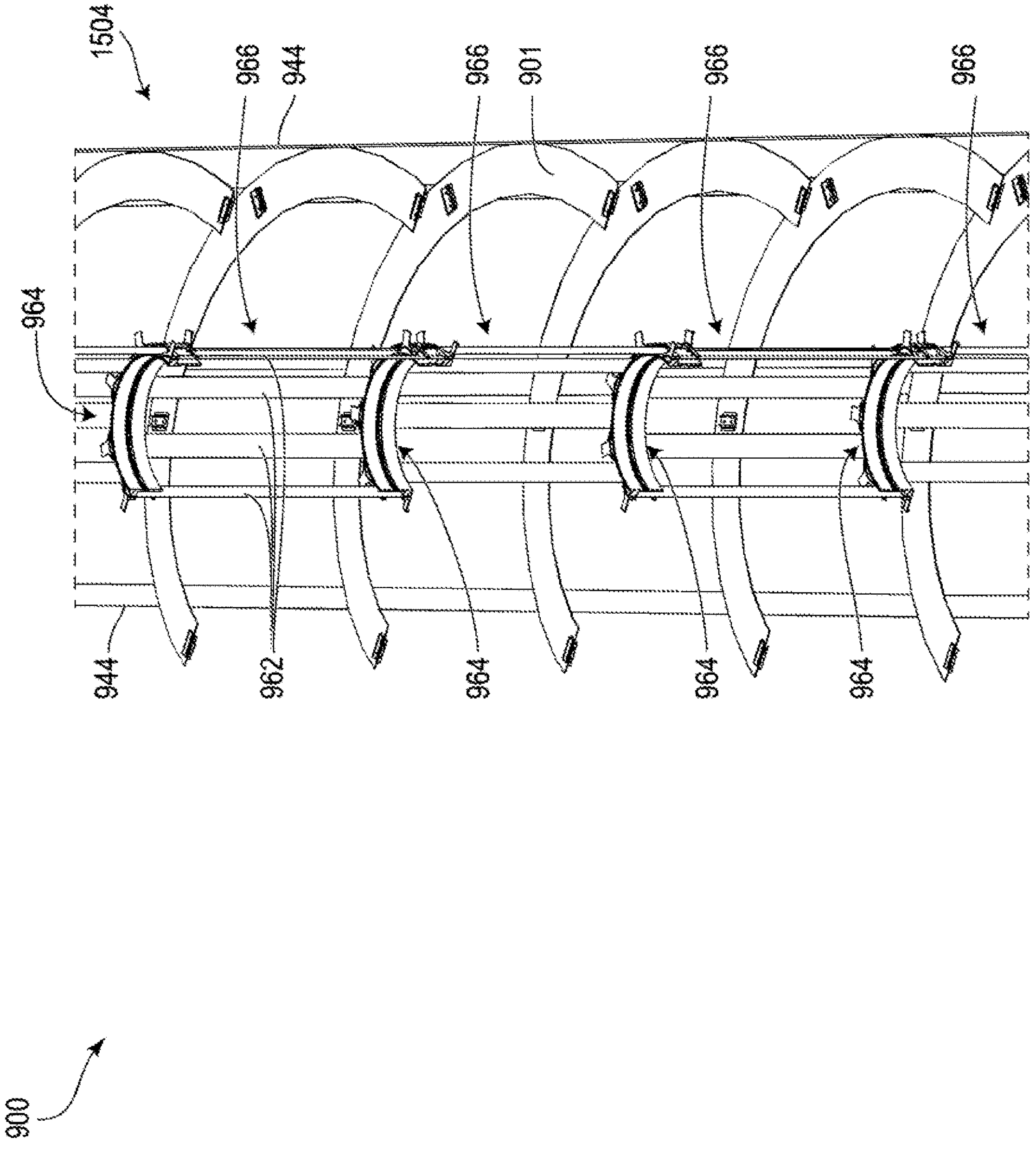
FIG. 16 is a cross-sectional perspective view of a portion of the extendable section of the deployable antenna assembly of FIG. 10 in isolation, according to an embodiment.

Referring now to FIGS. 15A, 15B, and 16, shown therein are cross-sectional views of the antenna assembly 900 in the deployed configuration 904 (as in FIG. 10).

FIG. 15A illustrates antenna assembly 900 in deployed configuration 904, while FIG. 15B is a close-up view of FIG. 15A in which a segment 1502 of the extendable section 908 of the antenna assembly 900 is omitted. Certain components described in reference to FIG. 13 are not repeated here but are shown using the same reference numerals.

In particular, the antenna assembly 900 includes deployable boom 942 in the deployed configuration including interface rings 964 and spring tapes 962. The launch tube 956 is constrained geometrically in the axial and radial directions both in the stowed configuration and the deployed configuration.

When all of the extendable elements are in the deployed configuration the deployable boom 942 is fully extended and the extendable helical radiating element 905 is fully deployed. The deployment of the extendable helix 901 occurs in the axial direction along a deployment axis 910, with minimal movement in the radial directions 913 along the radial axis 911 (radial directions 913 and radial axis 911 are illustrated in FIG. 10). The extendable helix 901 may have nearly free deployment along the axial direction 912. The helical radiating element 901 may have a high gain radiating pattern when deployed.

In some embodiments, the helical radiating element 905 is a thin membrane. This may to provide flexibility for both deployment and stowing. The thin membrane may also allow for a bonding surface of the fixed helix portion 928 to the rigid helix support 924.

The antenna cross section of the helical radiating element 901 provides a radiating surface to achieve the antenna axial RF gain.

The extendable helix 901 is constrained along the deployment (axial) axis 910 and the radial axis 911 by skate blades (not shown) when the extendable helix 901 is in the stowed configuration. The constraining provides support and rigidity while the extendable helix 901 is stowed.

The extendable helix 901 is constrained along the (axial) deployment axis 910 and the radial axis 911 by a skirt 944. The skirt 944 provides support and rigidity while the extendable helix 901 is deployed.

The helical radiating element 905 cross-section away from the antenna base plane is parallel to the radial direction of the radial axis 911. The parallel positioning may reduce the stack height of the helical radiating element 905 when stowed.

The helical radiating element 905 transitions from a vertical plane (being parallel to the axial plane/direction 910) to being a helical shape along the radial plane (i.e. from the fixed helix 928 to the extendable helix 901). The axial (vertical plane) portion of the helical radiating element 905 allows for attachment of the fixed helix 928 to the fixed section 906 (cylindrical stiff base 924). The radial plane portion of the helical radiating element 905 provides flexibility to the helix assembly for deployment.

The skirt 944 is configured to provide support to the extendable helix 901 in the radial direction 911 once deployed. The skirt 944 has minimal flexibility in the axial direction 910 in the stowed state to minimize the potential energy required for deployment.

In some embodiments, the skirt 944 is coated or surface treated with a conductive coating. The conductive coating may include a Ge coating or a carbon-loaded coating.

FIG. 16 illustrates a segment 1504 (shown in FIG. 15A) of antenna assembly 900 in deployed configuration 904 in isolation.

The segment 1504 illustrates a plurality of extendable elements in the deployed configuration including interface rings 964 and spring tapes 962 (fully extended). The segment 1504 also includes extendable radiating element 901 and skirt elements 944.

When the plurality of extendable elements 966 are in the deployed configuration the helical radiating element 905, and in particular extendable helix 901, is deployed and fills the RF functionality. When stowed, the helical radiating element 905 is optimized for minimum volume and the stiffness of the helical radiating element 905 is negligible along the deployment axis 910 so the force required for extension of the extendable helix 901 is minimal. When deployed, the extendable helix 901 is constrained by the skirt 944 to ensure the out-of-axis positioning of the extendable helix 901.

In some embodiments, the deployment of the deployable boom 942 is sequential to limit the maximal shock generated at the end of each stage of deployment (where a stage of deployment refers to the deployment of an extendable element). The launch tube 956 ensures that the deployment occurs along a single degree of freedom to ensure a reproducible behavior for the deployment dynamics.

The deployable boom 942 extends in the axial direction 912 along the interior of the helical radiating element 905. The STES 962 are positioned around the periphery of each extendable element 966 and extend simultaneously together in the axial direction. The spring tapes 962 allow for an efficient structure for the extendable pillar because the spring tapes 962 fulfill both functions of energy storage when stowed and assembly stiffness when deployed.

The helix shape of the helical radiating element 905 requires minimal mass for support both when stowed and deployed. The actuators used for initiating the conversion between the stowed and deployed configurations are of minimal mass because the power that is needed to be delivered is reduced over conventional designs.

The skirt 944 secures the off-axis positioning of the helical radiating element 901 between the halo 948 and the fixed section 906.

The launcher 958 manages the release of the stored potential energy in the spring tapes 962 when the extendable elements 966 convert from the stowed to the deployed configuration. The launch tube 958 directs the extension of the deployable boom 942 in the axial direction 912 during deployment.

In some embodiments, the deployment dynamics and shocks produced by the parts when deploying can be restrained using linear dampers. In some embodiments, any form of dampener may be used to reduce the shock produced during deployment.

Referring to FIG. 17, illustrated therein is a schematic representation of a system 1700 for sequentially deploying an extendable structure, according to an embodiment. The system 1700 may be implemented, for example, in the deployable antenna assembly 900 of FIGS. 9 and 10. The system 1700 may be implemented by the system 500 of FIG. 5.

The system 1700 includes an extendable structure comprising a plurality of extendable elements 1705*a*, 1705*b*, 1705 (collectively referred to as extendable elements 1705, and generically as extendable element 1705). The extendable elements 1705 store potential energy in a stowed configuration. The system 1700 can be used to sequentially deploy the extendable elements 1705 along a deployment axis 1735 in a direction 1730 of deployment through the release of the stored potential energy in the extendable elements 1705.

The system 1700 also includes a launch tube 1750, an inner shaft 1725 disposed in an interior cavity of the launch tube 1750, ball bearings 1720, a pin 1710, and a pin puller 1715.

The pin 1710 is connected to the inner shaft 1725 at a first end of the pin 1710 and the pin puller 1715 at a second end of the pin 1710. The pin puller 1715 is configured to pull or draw the pin 1710 along the deployment axis 1735 in the direction opposite the deployment direction 1730. As the pin 1710 is connected to the inner shaft 1725, the pulling of the pin 1710 by the pin puller 1715 also draws the inner shaft 1725 towards the pin puller 1715.

The inner shaft 1725 includes thick and thin sections. Thick section 1745 and thin section 1740 are shown as examples in FIG. 17. The thick and thin sections are sized and spaced along the length of the inner shaft 1725 such that each extendable element 1705*a*, 1705*b*, 1705*c* can be released sequentially. The thick and thin sections alternate along the length of the inner shaft 1725. The length of the thick sections of the inner shaft 1725 increase incrementally along the length of the inner shaft 1725 opposite deployment direction 1730, such that each thick section is longer than the previous thick section. The length of the thin sections of the inner shaft 1725 decrease incrementally along the length of the inner shaft 1725 opposite deployment direction 912. The thin sections may be considered spaced cavities along the length of the inner shaft 1725.

Generally, the ball bearings 1720 are constrained between the inner shaft 1725 and the launch tube 1750. The ball bearings 1720 include multiple subsets of ball bearings 1720 where each subset is designed to retain an extendable element 1705. While in FIG. 17 two ball bearings 1720 are shown per subset (i.e. per extendable element 1705), fewer or more ball bearings may be used.

The ball bearings 1720 include a first position and a second position. In the first position, the ball bearings contact a thick section 1745 of the inner shaft 1725 and contact the extendable element 1705 (e.g. an interface ring or annular member of the extendable element). By the ball bearings 1720 contacting the extendable element 1705, the extendable element 1705 is retained in the stowed configuration. In the second position, the ball bearings 1720 contact a thin section of the inner shaft 1725 and do not contact the extendable element (thereby enabling release of the extendable element 1705). The movement or displacement of the ball bearings from the first position to the second position is caused by the actuation of the inner shaft 1725 (i.e. the pin puller pulling the pin connected to the inner shaft 1725), which causes the ball bearing 1720 to contact a thin section of the inner shaft instead of a thick section of the inner shaft.

The sequential deployment system 1700 is shown at four stages of deployment 1701, 1702, 1703, 1704.

At deployment stage 1701, all of the extendable elements 1705 are in a stowed configuration. The pin 1710 is connected to a pin puller 1715 which pulls the pin 1710, pulling the inner shaft 1725 towards the pin puller 1715 (along the deployment axis 910, opposite the direction of deployment 1730). The inner shaft 1725 includes spaced cavities along the length of the inner shaft 1725.

The ball bearings 1720 are all in the first position in which the ball bearings 1720 contact the respective extendable elements 1705 and a thick section 1745 of the inner shaft 1725, constraining the extendable elements 1705 in the stowed configuration. In the stowed configuration, potential energy is stored in the extendable elements 1705 that can be released to provide a translational force for extending the extendable element 1705 along the deployment axis 1735 in direction 1730.

At deployment stage 1702, the inner shaft 1725 has been pulled by the pin puller 1715 along the deployment axis 1735 towards the pin puller 1715. The pulling of the pin 1710 also pulls the inner shaft 1725. The displacement of the inner shaft 1725 causes a first subset of the ball bearings 1720 to move from the first position to the second position as the ball bearings slide along the inner shaft from a thick section 1745 to a thin section 1740. Once in the second position, the first subset of the ball bearings 1720 no longer contact the first extendable element 1705*a*. As the first extendable element 1705*a* is no longer retained, the first extendable element 1705*a* deploys and extends along the deployment axis 1735 in direction 1730.

At deployment stage 1703, the second extendable element 1705*b* is deployed.

The pin puller 1715 pulls the pin 1710 further along the deployment axis 1735 towards the pin puller 1715. This draws the inner shaft 1725 further towards the pin puller 1715. By drawing the inner shaft 1725 further towards the pin puller 1715, a second subset of ball bearings 1720 (previously retaining the second extendable element 1705*b*) is displaced from the first position to the second position, such that the ball bearings come into contact with a thin section of the inner shaft 1725 and out of contact with the second extendable element 1705*b*. As the extendable element 1705*b* is no longer retained by the second subset of the ball bearings 1720, the extendable element 1705*b* deploys and extends along the deployment axis 1735 in the direction 1730.

At deployment stage 1704, the third expandable element 1705*c* is deployed and the extendable pillar is fully deployed and extended.

The pin puller 1715 pulls the pin 1710 further along the deployment axis 1735 towards the pin puller 1715. This draws the inner shaft 1725 further towards the pin puller 1715. By drawing the inner shaft 1725 further towards the pin puller 1715, a third subset of ball bearings 1720 (previously retaining the third extendable element 1705*c*) is displaced from the first position to the second position, such that the ball bearings 1720 come into contact with a thin section of the inner shaft 1725 and out of contact with the third extendable element 1705*c*. As the third extendable element 1705*c* is no longer retained by the third subset of ball bearings 1720, the third extendable element 1705*c* deploys and extends along the deployment axis 1735 in the direction 1730.

Note that the sizing and the spacing of the thick sections of the inner shaft 1725 are dimensioned such that subsets of ball bearings 1720 for retaining extendable elements 1705 later in the sequential deployment remain in contact with a thick section of the inner shaft 1725 for longer as the pin 1710 is pulled to deploy earlier-deployed extendable elements 1705. This is so the subset of ball bearings 1720 maintains contact with the extendable element 1705 to retain the extendable element 1705. Similarly, the sizing and spacing of the thin sections of the inner shaft 1725 are dimensioned such that subsets of ball bearings 1720 displaced into the second position (where they are not in contact with the extendable element 1705) remain in the second position as the other extendable elements 1705 are deployed.

The potential energy stored in the spring tapes s sufficient to ensure deployment under various scenarios, including without limitation, friction and parasitic loads. The launch tube or telescopic post ensures that the deployment occurs along a single degree of freedom to ensure the reproducible behavior of the deployment dynamics.

The simultaneous or sequential deployment is managed through the release of a ball bearings 1720 captured between the camshaft 1725, launch tube 1750 and each ring of the extendable element 1705. In some embodiments the ball bearings 1720 may be replaced by another suitable retaining device. The retaining device may be configured to hold the interface rings in a stowed position until deployed. In some embodiments, the deployment may be simultaneous where the cavities are spaced and sized to allow the ball bearings 1720 retaining multiple sets of expandable elements 1705 to release simultaneously.

Once all bearings 1720 are freed from the interface ring of the extendable element 1705, the extendable element 1705 initiates its deployment under the force of the spring blade.

An actuator provides the force necessary to exert the relative movement between the camshaft and the launch tube to achieve the controlled deployment of each extendable element 1705. The order of interface ring deployment allows all of the extendable elements 1705 to deploy in a controlled fashion, including the last deployed extendable element.

Deployment simplicity is achieved with potential energy stored in the stowed system. Other systems may require a motor to provide the energy to the system to drive deployment.

The actuator power required to release each stage sequentially is relatively low as actuation friction loads are minimized.

The sequential deployment provides relatively low shocks compared to non-sequential deployment and improved control along the axial direction.

Referring now to FIG. 18, illustrated therein is a system 1800 for simultaneous deployment of an extendable structure, according to an embodiment. The system 1800 may be implemented by the system 500 of FIG. 5.

In FIG. 18, the system 1800 is shown in a stowed configuration 1801 and a deployed configuration 1802. The system 1800 is configured to extend an extendable structure 1835 along a deployment axis 1806 defined by the extendable structure 1835 in a direction of deployment 1855.

The system 1800 includes the extendable structure 1835 which includes interface rings (annular members) 1860 and spring tapes 1815 attached to the interface rings 1860.

The system 1800 also includes a telescopic post 1875 (including components 1875*a*, 1875*b*, 1875*c*), and a support structure including a skirt 1870 and a halo 1805.

The halo 1805 is attached to the telescopic post 1875, the skirt 1870, and the spring tapes 1815.

The skirt 1870 is extendable, having a stowed configuration and a deployed configuration (i.e. the skirt 1870 is longer along the deployment axis 1806 in the deployed configuration).

The system 1800 also includes a retaining device for retaining the extendable structure 1804 in the stowed configuration 1801 including a retaining wire 1825, first and second retaining pins 1840, 1850 at opposing ends of the retaining wire 1825, and a releasing component 1820 for holding and releasing the second retaining pin 1850. The releasing component 1820 may be a Frangibolt, sepnut, or the like.

Each spring tape 1815 is connected to at least one interface ring 1860. The spring tapes 1815 that are furthermost in the extendable structure 1835 in the deployment direction 1855 connect to an interface ring 1860 and to the halo 1805. The spring tapes 1815 furthermost in the extended structure 1835 in the opposite direction of the deployment direction 1855 connect to an interface ring 1860 and a fixed base support structure 1890 (which is attached to a fixed section 1865, described below). The base support 1890 may be a component of the telescopic post 1875. The other 1815 in the extendable structure 1835 are connected to interface rings 1860 at both ends of the 1815.

The system 1800 includes a deployable mass, which in the embodiment of FIG. 18 is a helical radiating element ("helix"). The helix 1810 is extendable (i.e. axially translatable along the deployment axis 1855) and includes a stowed configuration and a deployed configuration. The helix 1810 is attached to the skirt 1870 at a plurality of attachment points. The extension of the skirt 1870 upon deployment of the extendable structure 1835 causes the extension of the extendable helix 1810.

The system 1800 also includes a fixed section 1865. The fixed section 1865 may be cylindrical. The fixed section may be a rigid helix support. The fixed section 1865 includes an interior cavity 1885 in which at least a section of the extendable structure 1835, telescopic post 1875, and other components are disposed in the stowed configuration 1801. The telescopic post 1875 is mounted to the fixed section 1865 via the base support 1890.

The fixed section 1865 includes a fixed helical radiating element 1895 mounted to an exterior surface of the fixed section 1865. The fixed helix 1895 connects to the extendable helix 1810 such that RF signals are transmittable between the extendable helix 1810 and the fixed helix 1895.

Referring now to the stowed configuration 1801, the system 1800 stores potential energy in the spring tapes 1815 (which are in a folded or bent configuration) between the interface rings 1860.

The retaining wire 1825 connects to the halo 1805 via the first retaining pin 1840. The first retaining pin 1840 is secured to the halo 1805 via a bolt 1845. The retaining wire 1825 connects via the second retaining pin 1850 to the releasing component 1820, which is fixed to the base support 1890. The releasing component 1820 may be capable of supporting a tension of 100 lbs.

The helical radiating element 1810 is stowed for storage and transport.

Referring now to the deployed configuration 1802, the connection between the second retaining pin 1850 and the releasing component 1820 is disengaged, releasing the second retaining pin 1850 and releasing the tension in the retaining wire 1825. Release of the retaining wire 1825 enables extension of the spring tapes 1815 through release of the stored potential energy. Extension of the spring tapes 1815 extend the extendable structure 1835, driving the halo 1805 in the direction of deployment 1855. The skirt 1870, which is connected to the halo 1805, extends as the halo 1805 is axially translated in the deployment direction 1855. The extendable helix 1810, which is connected to the skirt 1870, extends as the skirt 1870 extends to deploy the extendable helical radiating element 1810 to its full length. Extending the extendable helix 1810 to its full length provides maximal RF gain.

The deployment simplicity of the system 1800 is achieved using the potential energy stored in the stowed system 1801. In contrast, conventional systems may require a motor to provide the energy to deploy the system, which can increase mass and cost. The stored potential energy required to release the boom (i.e. the extendable structure 1835) is relatively low because actuation friction loads are minimized. In some embodiments, actuation friction is minimized by using low friction surface finishes on the sliding surfaces, such as a surface coating with a low friction coefficient. In some embodiments, the friction between contacting elements is minimized geometrically by increasing the lever arm and thus decreasing the normal-to-contact surface loads acting against the external moments.

Figure 19:
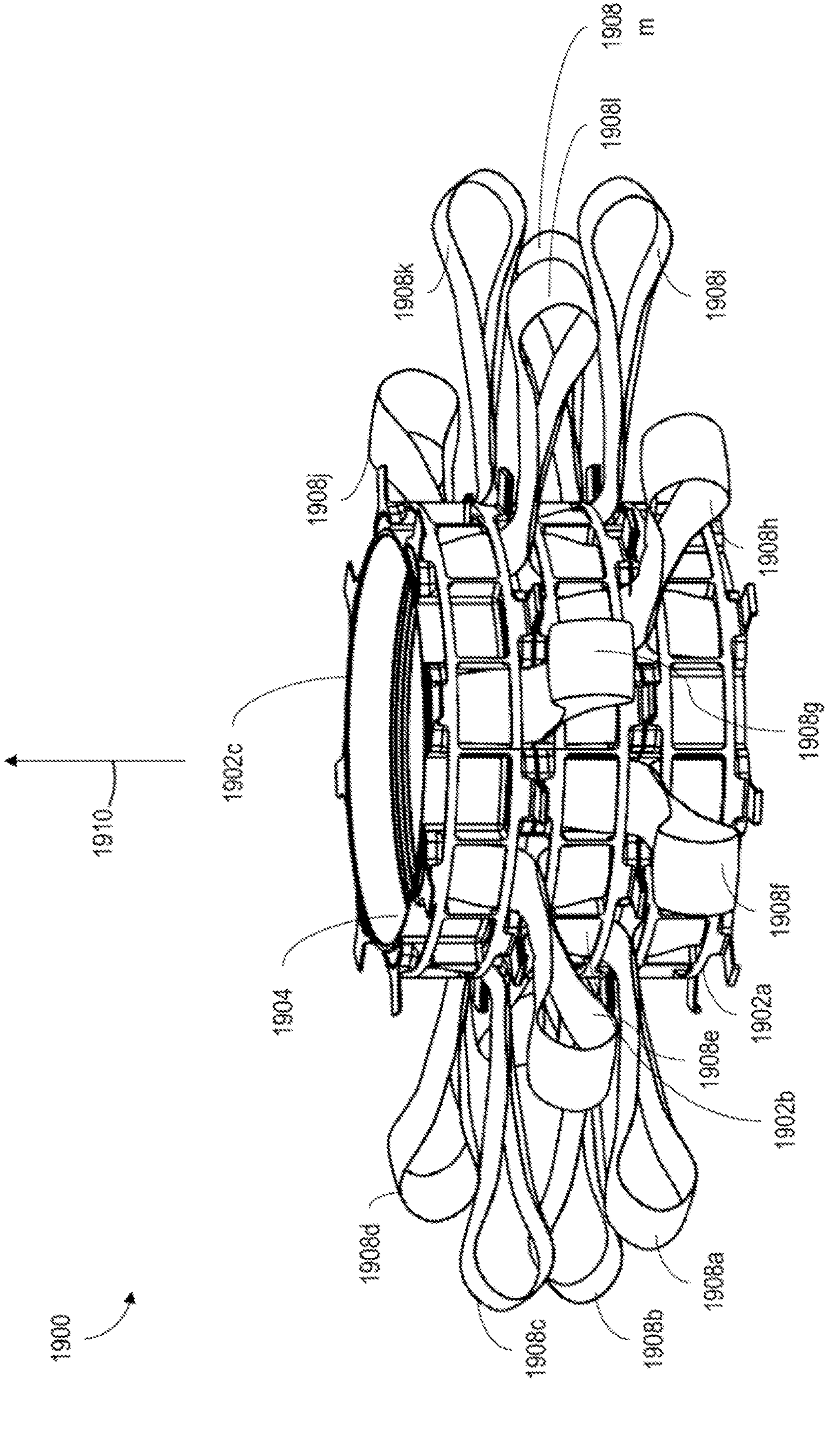
FIG. 19 a perspective view of a plurality of extendable elements of an extendable section of a deployable antenna assembly in isolation, the plurality of extendable elements in a stowed configuration, according to an embodiment.

Referring now to FIG. 19, shown therein is a plurality of extendable elements 1900 of an extendable section (e.g. extendable section 908) of a deployable antenna assembly (e.g. assembly 900) in isolation, according to an embodiment. In particular, the extendable elements 1900 form part of a deployable boom (or extendable pillar).

The extendable elements 1900 are illustrated in a stowed configuration. In the stowed configuration as part of a deployable boom, the extendable elements are retained in the stowed configuration by a retaining device (not shown in FIG. 19).

The extendable elements 1400 in FIG. 19 represent a variant of the extendable elements shown in FIG. 14. In particular, extendable elements 1900 vary in the number of spring tape extendable structures per interface ring (four in FIG. 14 versus eight in FIG. 19).

The extendable elements 1900 include interface rings 1902*a*, 1902*b*, and 1902*c*. Interface rings 1902*a*, 1902*b*, 1902*c* are referred to collectively as interface rings 1902 and generically as interface ring 1902. Each interface ring 1902 includes an aperture 1904 through which a launch tube (e.g. launch tube 956 of FIGS. 9-13) is disposed.

The extendable elements 1900 include spring tape extendable structures (or spring tapes) 1908*a*, 1908*b*, 1908*c*, 1908*d*, 1908*e*, 1908*f*, 1908*g*, 1908*h*, 1908*i*, 1908*j*, 1908*k*, 19081, 1908*m* referred to collectively as spring tapes 1908 and generically as spring tape 1908. The spring tapes 1908 are in a stowed configuration in which the spring tapes 1908 are folded or bent. In the stowed configuration, the spring tapes 1908 store potential energy that can be released to extend the extendable elements 1900 in deployment direction 1910.

The spring tapes 1408 are attached to the interface rings 1402 such that the spring blades 1408 are arranged axisymmetrically about a boom axis.

As described herein, an extendable element (or extendable section or extendable unit), unless otherwise stated, refers to a plurality of spring tapes 1908 and the interface ring 1902 to which those spring tapes 1408 are attached which deploys in deployment direction 1910 under the translational force of the spring tapes 1908. For example, interface ring 1902*a* and the eight spring tapes 1908*a*, 1908*b*, 1908*f*, 1908*h*, 1908*i* (three spring tapes not shown) form an extendable element. Interface ring 1902*a* deploys in deployment direction 1910 under the translational force of spring tapes 1908*a*, 1908*b*, 1908*f*, 1908*h*, 1908*i* and the three spring tapes which are not shown upon release of the stored potential energy in spring tapes 1908*a*, 1908*b*, 1908*f*, 1908*h*, 1908*i* and the three not shown.

Generally, in the stowed configuration, the spring tapes 1908 are constrained in a folded configuration by and between interface rings 1902. The interface rings 1902 are retained in the stowed position by a retaining device (not shown). Upon release of the retaining device (e.g. by an actuator component of a launcher), the interface rings 1902 are freed and the spring tapes 1908 extend.

While the above description provides examples of one or more apparatus, methods, or systems, it will be appreciated that other apparatus, methods, or systems may be within the scope of the claims as interpreted by one of skill in the art.

The invention claimed is:

1. A deployable antenna assembly comprising:

an extendable pillar configured to extend in an axial direction along a deployment axis of the deployable antenna assembly to deploy an antenna, the extendable pillar comprising:

at least one extendable element configured to convert between a stowed configuration and a deployed configuration, wherein the extendable element in a deployed configuration is longer in the axial direction than the extendable element in a stowed configuration;

a retaining device for retaining each extendable element in the stowed configuration in which extension of the respective extendable element is constrained and the respective extendable element stores potential energy that is releasable to extend the respective extendable element along the deployment axis, the retaining device comprising:

a launch tube disposed within the extendable pillar along the deployment axis;

an inner shaft disposed in the launch tube; and a plurality of ball bearings;

wherein, for each extendable element in the stowed configuration, a subset of the ball bearings contacts and prevents deployment of the extendable element in the axial direction; and wherein movement of the inner shaft relative to the launch tube displaces the subset of ball bearings such that the respective extendable element is no longer constrained by the subset of ball bearings and extends in the axial direction via release of the stored potential energy.

2. The deployable antenna assembly of claim 1, further comprising a helical radiating element configured to connect to the extendable pillar such that an extendable section of the helical radiating element is translated in the axial direction along the deployment axis upon the extension of the extendable pillar in the axial direction, the helical radiating element configured to transmit or receive a radio frequency (RF) signal.

3. The deployable antenna assembly of claim 1, wherein the extendable pillar comprises a plurality of extendable elements.

4. The deployable antenna assembly of claim 3, wherein the retaining device initiates conversion of each of the extendable elements sequentially.

5. The deployable antenna assembly of claim 1, wherein each of the extendable elements further comprises at least one spring tape extendable structure, the at least one spring tape extendable structure folded when the extendable element is in the stowed configuration and unfolded when the extendable element is in the deployed configuration, and wherein the at least one spring tape extendable structure is constrained in the stowed configuration and stores potential energy releasable to extend the respective extendable element in the axial direction.

6. The deployable antenna assembly of claim 1, wherein the axial and bending stiffness for the at least one extendable element is at least 2 orders of magnitude greater in the deployed configuration than in the stowed configuration.

7. A system for a deployable antenna assembly, the system comprising:

a plurality of extendable elements, wherein each extendable element is configured to:

connect with another extendable element to form an extendable pillar, wherein the extendable pillar is configured to extend in an axial direction along a deployment axis; and convert between a stowed configuration and a deployed configuration, wherein each of the extendable elements in a deployed configuration is longer in the axial direction than an extendable element in a stowed configuration;

a retaining device for retaining each extendable element in the stowed configuration in which extension of the respective extendable element is constrained and the respective extendable element stores potential energy that is releasable to extend the respective extendable element along the deployment axis, the retaining device comprising:

a launch tube disposed within the extendable pillar along the deployment axis;

an inner shaft disposed in the launch tube; and a plurality of ball bearings;

wherein, for each extendable element in the stowed configuration, a subset of the ball bearings contacts and prevents deployment of the extendable element in the axial direction; and wherein movement of the inner shaft relative to the launch tube displaces the subset of ball bearings such that the respective extendable element is no longer constrained by the subset of ball bearings and extends in the axial direction via release of the stored potential energy; and a helical radiating element configured to:

connect, directly or indirectly, to the extendable pillar;

extend an extendable section of the helical radiating element, wherein the extendable section is translated in the axial direction along the deployment axis upon the extension of the extendable pillar in the axial direction; and transmit or receive a radio frequency (RF) signal.

8. A method of deploying an antenna, the method comprising:

providing an extendable pillar configured to extend in an axial direction along a deployment axis of the deployable antenna assembly to deploy an antenna, the extendable pillar comprising:

at least one extendable element configured to convert between a stowed configuration and a deployed configuration, wherein the extendable element in a deployed configuration is longer in the axial direction than the extendable element in a stowed configuration;

retaining, via a retaining device, each extendable element in the stowed configuration in which extension of the respective extendable element is constrained and the respective extendable element stores potential energy that is releasable to extend the respective extendable element along the deployment axis, the retaining device comprising:

a launch tube disposed within the extendable pillar along the deployment axis, an inner shaft disposed in the launch tube, and a plurality of ball bearings;

wherein, for each extendable element in the stowed configuration, a subset of the ball bearings contacts and prevents deployment of the extendable element in the deployment direction; and actuating the inner shaft relative to the launch tube to displace the subset of ball bearings such that the respective extendable element is no longer constrained by the subset of the ball bearings and extends in the deployment direction via release of the stored potential energy.

9. The method of claim 8, wherein the extendable pillar comprises a plurality of extendable elements.

10. The method of claim 9, wherein each of the extendable elements are converted from the stowed configuration and the deployed configuration sequentially.

11. The method of claim 8, further comprising passively extending a helical radiating element connected to the extendable pillar concurrently with the extension of the extendable pillar, wherein an extendable section of the helical radiating element connected to the extendable pillar is translated in the axial direction along the deployment axis upon the extension of the extendable pillar in the axial direction, the helical radiating element configured to transmit or receive a radio frequency (RF) signal.

12. The method of claim 8, wherein converting the extendable element between the stowed configuration and the deployed configuration comprises converting one or more spring tape extendable structures from a folded configuration to an extended configuration, thereby releasing potential energy stored by the one or more spring tape extendable structures in the folded configuration.

13. The method of claim 8, further comprising:

inputting a command on a user terminal to convert each of the extendable elements from a stowed configuration to a deployed configuration; and transmitting the command from a base station to a communications satellite, the extendable pillar disposed on the communications satellite; and performing the method of claim 8 in response to receiving the command.

14. The method of claim 8, wherein the axial and bending stiffness for each extendable element is greater in the deployed configuration than in the stowed configuration.

15. The method of claim 14, wherein the axial and bending stiffness for the at least one extendable element is at least 2 orders of magnitude greater in the deployed configuration than in the stowed configuration.

16. The method of claim 8, further comprising guiding, via a launcher, each extendable element along the axial direction during conversion from the stowed configuration to the deployed configuration.

17. The deployable antenna assembly of claim 1, wherein the inner shaft is a camshaft and for each respective extendable element in the stowed configuration the subset of the ball bearings are captured between the camshaft, the launch tube, and the respective extendable element.

18. The deployable antenna assembly of claim 17, wherein the camshaft includes thick and thin sections that are sized and spaced along a length of the inner shaft such that each extendable element is released sequentially.

19. The deployable antenna assembly of claim 18, wherein, for each extendable element, the movement of the subset of the ball bearings retaining the respective extendable element is from a first position in which the subset of the ball bearings are in contact with one of the thick sections of the camshaft to a second position in which the subset of the ball bearings are in contact with one of the thin sections of the camshaft.

20. The deployable antenna assembly of claim 19, wherein the thick and thin sections alternate along the length of the camshaft, wherein length of the thick sections increases incrementally along the length of the camshaft in a first direction and length of the thin sections decreases incrementally along the length of the camshaft in the first direction.

* * * * *